(12) United States Patent
Vaananen

(10) Patent No.: US 11,521,181 B2
(45) Date of Patent: *Dec. 6, 2022

(54) MOBILE SECRETARY MEETING SCHEDULER

(71) Applicant: Mikko Vaananen, Helsinki (FI)

(72) Inventor: Mikko Vaananen, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 17/698,822

(22) Filed: Mar. 18, 2022

(65) Prior Publication Data

US 2022/0207491 A1    Jun. 30, 2022

Related U.S. Application Data

(63) Continuation of application No. 16/848,873, filed on Apr. 15, 2020, now Pat. No. 11,315,082.
(Continued)

(51) Int. Cl.
   *G06F 15/16* (2006.01)
   *G06Q 10/10* (2012.01)
   (Continued)

(52) U.S. Cl.
   CPC ......... *G06Q 10/1095* (2013.01); *G06N 20/00* (2019.01); *H04L 67/10* (2013.01); *H04M 1/72403* (2021.01); *H04M 1/72451* (2021.01)

(58) Field of Classification Search
   CPC .......................... G06Q 10/1095; H04L 67/10
   See application file for complete search history.

(56) References Cited

U.S. PATENT DOCUMENTS

| | | | |
|---|---|---|---|
| 11,004,041 B2 | 5/2021 | Stratvert et al. | |
| 2003/0204474 A1* | 10/2003 | Capek ............... | G06Q 10/109 705/64 |

(Continued)

FOREIGN PATENT DOCUMENTS

| | | |
|---|---|---|
| EP | 2410476 A1 | 1/2012 |
| WO | 2011020742 A1 | 2/2011 |
| WO | 2019102066 A1 | 5/2019 |

OTHER PUBLICATIONS

International Search Report and Written Opinion dated Jul. 10, 2020 in International Patent Application No. PCT/FI2020/050250.
(Continued)

*Primary Examiner* — Padma Mundur
(74) *Attorney, Agent, or Firm* — Patterson + Sheridan, LLP

(57) ABSTRACT

A cloud based intelligent secretary application, a method and a system for scheduling a meeting is disclosed. This includes a cloud based intelligent secretary application, running on a mobile device and a cloud server. The cloud based intelligent secretary application enables multiple users to form a group. The members of the group allow their mobile devices to be accessed by the cloud based intelligent secretary application. The cloud based intelligent secretary application receives a request for arranging a meeting with at least two members of the group. The cloud based intelligent secretary application calculates the meeting means, place and time that allow the minimum total disruption and cost, and/or, maximum efficiency for the meeting. The cloud based intelligent secretary application suggests the meeting means, place and time that allows the minimum total disruption and cost.

30 Claims, 17 Drawing Sheets

Related U.S. Application Data

(60) Provisional application No. 62/835,135, filed on Apr. 17, 2019.

(51) Int. Cl.
*H04L 67/10* (2022.01)
*H04M 1/72403* (2021.01)
*G06N 20/00* (2019.01)
*H04M 1/72451* (2021.01)

(56) References Cited

U.S. PATENT DOCUMENTS

| | | | |
|---|---|---|---|
| 2005/0018826 A1* | 1/2005 | Benco | H04M 3/565 |
| | | | 379/202.01 |
| 2005/0027581 A1* | 2/2005 | Kjesbu | H04L 9/40 |
| | | | 348/E7.083 |
| 2008/0167937 A1 | 7/2008 | Coughlin et al. | |
| 2010/0148954 A1* | 6/2010 | Bobier | H04W 4/02 |
| | | | 340/539.11 |
| 2015/0058057 A1* | 2/2015 | Egan | G06Q 10/1095 |
| | | | 705/7.19 |
| 2016/0032728 A1 | 2/2016 | Gallagher et al. | |
| 2016/0098687 A1 | 4/2016 | Lamons et al. | |
| 2018/0308473 A1 | 10/2018 | Scholar | |

OTHER PUBLICATIONS

Moujahid, A. "A Practical Introduction to Deep Learning with Caffe and Python," retrieved from http://adilmoujahid.com/posts/2016/06/introduction-deep-learning-python-caffe/, published Jun. 26, 2016.

Non-Final Office Action dated Jun. 24, 2021 in U.S. Appl. No. 16/848,873.

Andres Monroy-Hernandez and Justin Cranshaw, "How We Built a Virtual Scheduling Assistant at Microsoft," Harvard Business Review, Dated Jul. 28, 2017, pp. 1-7.

* cited by examiner

MOBILE SECRETARY MEETING SCHEDULER

CROSS-REFERENCE TO RELATED APPLICATIONS

This application is a continuation of U.S. Non-Provisional application Ser. No. 16/848,873 filed on Apr. 15, 2020, which claims benefit of and priority to U.S. Provisional Application Ser. No. 62/835,135 filed on Apr. 17, 2019, each of which are hereby incorporated by reference in their entirety.

TECHNICAL FIELD

The disclosure relates to scheduling a meeting between users through smartphones and more particularly to utilizing artificial intelligence in scheduling the meeting.

BACKGROUND ART

Modern smartphones carry numerous software applications that assist a user in planning a given day and to schedule meetings. For example, a calendar application assists the user to manually schedule events for the day. In another example, a meeting application assists the user to schedule a meeting with another user. In another example, a reminder application helps the user to set up reminders for matters that require attention of the user. There are applications such as Microsoft® Outlook®, Gmail™ webmail service etc., that includes the calendar, the meeting and/or the reminder applications to assist the user in manually planning and scheduling events for a day.

It is a tedious task for a user to schedule a meeting despite having many applications. The tediousness is due to a fact that it is a time and resource consuming process. For example, to schedule a meeting, the user has to send a meeting invite to the other user for a defined time slot of a day. It could be possible that the other user may not be available for the meeting at the defined time slot due to various reasons. Consequently, the other user declines the meeting. Thus, the efforts and time to schedule the meeting gets wasted. Alternatively, the user can communicate with the other user before scheduling a meeting. The users can communicate over emails, instant message applications or other means to discuss and arrive at consensus for meeting means, place and time prior to the meeting scheduling. Such discussions would require time, efforts, and at times costs, which could have been used for other productive tasks. In another alternative, the users can share their calendars to check for schedules. However, to see each other's calendars, the calendar applications would have to be of same vendor or at least cross compatible. Many times, the users are not comfortable sharing their calendars for various reasons including that of privacy concerns. In such cases, the users would have to resort to the aforementioned process of communication to arrive at a consensus to schedule the meeting, which is time and resource consuming. In yet another alternative, a user would have to employ a personal secretary for setting up meetings with other users. However, the personal secretary would come at a cost. Furthermore, the personal secretary would have to go through the same tedious process to schedule a meeting as described above.

Consider an example of three friends: John, Sara and James based out of a same town. Sara desires to meet with her friends John and James. Sara decides to contact John and James for the meeting. Sara sends a text message to John and James: "Let's meet at town center today". In response, John and James send response text messages indicating their willingness for the meeting. Sara, however, does not have calendars of John and James. Sara suggests an afternoon time slot for the meet in a text message. John indicates his inability to meet in the afternoon due to his prior commitments. James, however, agrees for the meeting. Sara and James spend some time continuing to communicate over text messages with John on deciding a time slot for the meeting. After spending some time conversing over text messages, John, Sara and James decide for an evening time slot. Further, Sara responds with a text message suggesting a location 'A' for the meet at town center. James, at the same time, responds with a text message suggesting a different place 'B' at town center. John joins the text message conversation, suggesting a completely different place 'C'. John and James disagree for Sara's suggestion of place 'A'. John, Sara and James spend more time exchanging text messages to decide on the place. By the time the friends decide on the place, they would have spent a significant amount of time and resources just to decide on time and place. If Sara had proceeded to plan for the meeting over phone calls, the efforts would not have been much different. To elaborate, Sara would have made phone calls to get in touch with John and James. John and James would have responded to get back to her looking at their schedules. Further rounds of calls would had been required to decide on time and place. The whole process of planning would have dampened the excitement of meeting with the friends. In the current example, the friends are in the same town. The process of planning can get complicated when the people intending to meet are in different cities/countries/continents, living in different time zones, having different means of communication, etc.

Consider another example of Joe, Sally and Kristina. Joe is based out of New York, while Sally is based out of London, and Kristina is based out of Berlin. Sally is the boss of Joe and Kristina. Sally wants to meet Joe and Kristina for a detailed discussion on a project. Sally tries to schedule a meeting with Joe and Kristina by sending a meeting invite. However, Joe and Kristina decline due to prior commitments. Sally sends an email to Joe and Kristina asking for available time slots for a meeting for a given day. Joe and Kristina communicate their preferred time slots which do not overlap. Adding to the complexity is different time zones and geographical locations. Sally continues to communicate with Joe and Kristina to discuss and identify a time slot that works for all the three. Meanwhile Sally gets frustrated due to consumption of significant amount of time and efforts to schedule a meeting. Sally is finding it extremely difficult to schedule a meeting as Joe and Kristina are in different time zones and geographical areas. Sally finds that it takes a lot of time and efforts to figuring out an available time slot for the meeting. Sally continues to put efforts and time to communicate with Joe and Kristina to discuss and identify a time slot that works for all the three. Sally understands that there is no easy way to schedule a meeting with available scheduling applications.

US20180308473A1 discloses virtual assistant systems and related methods. The intelligent virtual assistant systems include a processor and memory coupled to the processor, the memory comprising at least one executable instruction that when executed causes the processor to effectuate operations comprising: receiving at least one input parameters indicative of a plurality of campaigns and a plurality of prompts from at least one campaign applications; determining a campaign flow based on the at least one input parameters; and generating, based on the campaign flow, an intelligent virtual assistance application. The disclosed intelligent virtual assistant systems and related methods can be used for counselling and coaching people, for example children and adults with special needs, such as autism by scheduling campaigns.

Thus, the prior art feature is focused on counselling and coaching multiple users virtually by a virtual assistant system based on a campaign flow. However, the virtual assistant system of the prior art does not solve a multi-body problem for multiple users and is not capable of resolving the meeting scheduling challenges of the smartphone user in a significant way.

SUMMARY OF INVENTION

It is an object of the invention to address and overcome deficiencies in prior art. The object of one or more embodiments of the invention is to provide a cloud based intelligent secretary application, to manage scheduling of meetings at a minimal disruption and cost.

The central philosophy of one or more embodiments the invention is to enable the user to schedule meetings using an artificial intelligence enabled cloud based intelligent secretary application in the device. To achieve this aim, technical software embodiments are produced in the following.

It is an object of one or more embodiments of the invention, to assist a user in scheduling a meeting and/or arrange a meeting for the user, and eliminate a lot of the taxing, repetitive back and forth communication that is associated with scheduling a meeting. Such assistance is provided to the user by the cloud based intelligent secretary application configured to operate in a mobile client device and cloud server network. Present invention is described using the application, methods, and system, as explained below.

In one aspect of the invention, a cloud based intelligent secretary application is realized on a mobile device and a cloud server. The cloud based intelligent secretary application accesses the mobile devices of the users including mobile applications. The cloud based intelligent secretary application uses data obtained from the mobile devices to understand schedules of the users. The cloud based intelligent secretary application uses the data to schedule meetings between the users. In response to receiving a request for arranging a meeting, the cloud based intelligent secretary application utilizes the data to determine schedules of the users. Further, cloud based intelligent secretary application calculates a meeting means, place and time in a way to minimize disruption and cost. The cloud based intelligent secretary application maximizes efficiency for the meeting by reducing the effort of planning and scheduling the meeting. The user merely has to request for a meeting. In response, the user receives suggestions of meeting means, place and time, optimized for the participant users intended for the meeting.

Consider the example of Joe, Sally and Kristina that was discussed in the Background. These people are now using one or more embodiments of the invention. Sally, Joe and Kristina are each provided with a cloud based intelligent secretary application on their respective mobile phones that are connected to the cloud. Sally accesses her cloud based intelligent secretary application to schedule a meeting with Joe and Kristina. The cloud based intelligent secretary application having accesses to mobile devices of Sally, Joe and Kristina, obtains scheduling information from these mobile devices. Based on location information obtained from these mobile devices, the cloud based intelligent secretary application knows the locations of the Joe, Kristina and Sally. Also, the cloud based intelligent secretary application understands time zone differences. In addition, the cloud based intelligent secretary application understands the professional ranks of Joe, Kristina and Sally. Furthermore, the cloud based intelligent secretary application also understands personal preferences of each of Joe, Kristina and Sally. Using the above information, the cloud based intelligent secretary application calculates a meeting means, place and time for Joe, Kristina and Sally. The cloud based intelligent secretary application uses different weights while performing this calculation. For example, the cloud based intelligent secretary application provides more weight to Sally's schedules underlining the importance of Sally's time as boss. Joe's and Kristina's time are given lower weight as compared to Sally. The weight might be based on the salary of the employee or based on the value of the employee time from the company perspective, which might be different, among other things.

The cloud based intelligent secretary application ensures a near ideal time, place and meeting means for the meeting. For example, if the cloud based intelligent secretary application determines that Joe, Kristina and Sally are geographically far away for a physical meeting, the cloud based intelligent secretary application schedules a meeting through a virtual means at a time zone suitable for all Sally, Joe and Kristina. The virtual means could be dependent on capabilities of the mobile devices of Sally, Joe and Kristina. If Sally, Joe and Kristina have video conference capabilities in their mobiles with sufficient bandwidth to support the video conference, then the cloud based intelligent secretary application selects a video conference as meeting means. All the above activities happen based on a simple request from Sally. Sally does not have to put a lot of effort and time to schedule a meeting with Joe and Kristina. Sally's time is very well respected, and meeting is arranged conveniently without much hassle. The cloud based intelligent secretary application reduces efforts, time and costs involved in scheduling a meeting. Also, since the meeting is optimized, the user inconvenience is minimized, and experience is enhanced.

A cloud based intelligent secretary application, running on a mobile device and a cloud server is in accordance with the invention and characterized in that, multiple users allow their mobile devices to be accessed by the intelligent secretary application, and a meeting request is configured to be launched by a user, the cloud based intelligent secretary application is configured to receive a request for arranging a meeting, the cloud based intelligent secretary application is configured to calculate a meeting means, place and time that allows a minimum total disruption and cost, and/or, maximum efficiency for the meeting by accessing mobile device data of all or some meeting participants, and the cloud based intelligent secretary application suggests the meeting means, place and time that allows the minimum total disruption and cost to all or some of the participants.

The cloud based intelligent secretary application can access any of the following: cloud accounts of the user, calendar, email, mobile device location, and/or reminder application of the user, and typically from multiple users. The meeting request is received from any user.

Or a group is formed, and the meeting request is received from a member of the said group to other members of this group. Sometimes meeting requests and communication between members of the group and non-members are facilitated.

Preferably the meeting participants do not see the data from other participants, such as calendar data and the like. One key advantage of the cloud based intelligent secretary application is that it computes and produces meeting suggestions without going to the details of why some time does not work for some participant. By operating like an "escrow server" of calendar details of multiple people, the inventive cloud based intelligent secretary application increases both privacy and efficiency. In some preferred embodiments the client device application only contains data from the user of the client, for example the calendar of the user. The calendar is communicated to the cloud server, and meeting suggestion parameters are returned from the server to the client device application. This arrangement increases privacy and information security, because if the calendar data of another person is never communicated to the user, and vice versa, the client device and their application software cannot divulge confidential calendar information from another person, as that information never even existed at the client device. However, it is of course possible to distribute information processing differently between client and server devices in accordance with the invention.

The meeting request indicates a topic for the meeting and/or duration. The calculation as described herein is a weighted average calculation performed to determine the suggested meeting means, place and time. The cloud based intelligent secretary application provides an option, to the members of the group who are provided with the suggestion about the meeting means, place and time, to accept or decline the suggestion. In one case, the cloud based intelligent secretary application generates multiple suggestions, and selects the meeting means, place and time most widely accepted by the member responses. The cloud based intelligent secretary application allows each or some users to define a personal profile that guides the cloud based intelligent secretary application in the weighted average calculation.

In one aspect of the invention, the cloud based intelligent secretary application enables at least one user to home in on another user, who is allowed to move, as the other users are configured to find and be directed to another user at this location.

A method for assisting a user and/or managing tasks of the user, by a cloud based intelligent secretary application configured to operate on a mobile device and a cloud server is in accordance with the invention and characterized by the following steps,
 all or some users allow their mobile devices to be accessed by the cloud based intelligent secretary application, and a meeting request is launched,
 receiving a request for arranging a meeting with at least two users,
 calculating the meeting means, place and time that allows minimum total disruption and cost, and/or, maximum efficiency for the meeting by accessing mobile device data of all or some users, and
 suggesting the meeting means, place and time that allows the minimum total disruption and cost to all or some participants of the meeting.

The method includes enabling the cloud based intelligent secretary application to access, from multiple users, any of the cloud accounts of the user, calendar, email, mobile device location, and/or reminder application. Sometimes the meeting request is received from a member of a group, indicating a topic for the meeting and/or duration. Sometimes the meeting request is sent or received by a non-member meeting participant. The calculation performed to determine the suggested meeting means, place and time as described herein is typically a weighted average calculation.

The method includes providing an option, to members of the group or other participants who are provided with the suggestion about the meeting means, place and time, to accept or decline the suggestion. The method further includes generating multiple suggestions, and selecting a meeting means, place and time that is most widely accepted by the member and/or participant responses. The method also includes allowing each or some users to define a personal profile that guides the cloud based intelligent secretary application in the weighted average calculation. The method further includes enabling at least one user to home in on one user, who is allowed to move, as the other users are enabled to find and be directed to this user at his location.

A system for assisting a user and/or managing tasks of the user, comprising a cloud based intelligent secretary application configured to operate on a mobile device and a cloud server is in accordance with the invention and characterized by,
 system being configured to send a meeting request,
 an access module of the cloud based intelligent secretary application configured to access mobile devices of the users,
 a receiving module of the cloud based intelligent secretary application configured to receive a request for arranging a meeting with at least two users,
 an AI module of the cloud based intelligent secretary application configured to calculate a meeting means, a place and a time that allows minimum total disruption and cost, and/or, maximum efficiency for the meeting by accessing the mobile device data of each user or some users, and
 a suggestion module of the cloud based intelligent secretary application configured to suggest the meeting means, place and time that allows the minimum total disruption and cost to the participating users.

The system includes an access module of the cloud based intelligent secretary application configured to access, from multiple users, any of the following: the cloud accounts of the user, calendar, email, mobile device location, and/or reminder application. The receiving module of the cloud based intelligent secretary application is configured to obtain from a user or a requesting member of a group, a topic for the meeting and/or duration in the meeting request. The calculation performed to determine the suggested meeting means, place and time as described herein is typically a weighted average calculation. The system also includes an option module to provide members of the group or other participants with a suggestion about the meeting means, place and time, and an option to accept or decline the suggestion. The system also includes a multiple suggestion module to generate multiple suggestions. The meeting means, place and time most widely accepted by the user responses is typically selected. The system further includes a profile module to allow each or some users to define a personal profile configured to be accessed during the weighted average calculation.

Also, the system includes a homing module to enable at least one user to home in on another user, who is allowed to move, as the other users are configured to find and be directed to him/her at his/hers current or future location.

The invention has multiple advantages. One or more embodiments of the invention provide the best meeting time, place and forum for everybody without laborious questions and back forth communication. One or more embodiments improve privacy, because the cloud server can record the calendars of the participants and calculate and optimum meeting parameters without revealing the contents of the other user's calendars to meeting participants.

The best mode of the invention is considered to be the cloud based intelligent secretary application that is running on the mobile device and the cloud server, and is integrated to the cloud account of the user. In the best mode, the intelligent secretary application continuously collects and updates self-learning files from the cloud account to develop an understanding of the schedules and preferences of the user. The intelligent secretary application may also collect and update self-learning files from the cloud network to develop an understanding of the schedules and preferences of the other meeting participants that the user has interacted with, is interacting with, or is planning to interact with. These self-learning files typically comprise the calendars of the meeting participants. The cloud network makes the schedule and preference data available to the cloud based intelligent secretary application on the mobile client terminals to enable optimal meeting scheduling decisions based on the concurrent use of schedules from multiple users. In the best mode, the cloud based intelligent secretary application develops a knowledge base of schedules of the users. Using this knowledge, the cloud based intelligent secretary application automatically determines and suggests meeting means, place and time that suits the convenience of the users, with minimal disruptions and cost, and improved efficiencies to the users participating in the meeting. The best mode of the invention is considered to be a productivity tool, such as Microsoft Teams.

The best mode for implementing the invention could be a Microsoft Teams application.

Some embodiments of the invention are described in the dependent claims.

DESCRIPTION OF EMBODIMENTS

The present disclosure provides an application, a method, and a system for assisting a user and/or arranging meetings of the user. The meetings are arranged by a cloud based intelligent secretary application accessing one or more applications installed in a mobile client device of the user. The cloud based intelligent secretary application may be available over Google Play™ store for downloading over Android smartphones, over App Store™ for downloading over iOS™ smartphones and/or over any other known application stores. The cloud based intelligent secretary application may either be available for free or as a paid application.

The cloud based intelligent secretary application is henceforth explained to utilize Artificial Intelligence for several purposes. Known machine learning tools/deep learning frameworks may be utilized with or without modifications. A few such known machine learning tools comprise Caffe™, Api.ai™, TensorFlow™, Mahout™, OpenNN™, H20™, MLlib™ NuPIC™, OpenCyc™, Oryx 2™, PredictionIO™, SystemML™, TensorFlow™, and Torch™.

Figure 1:
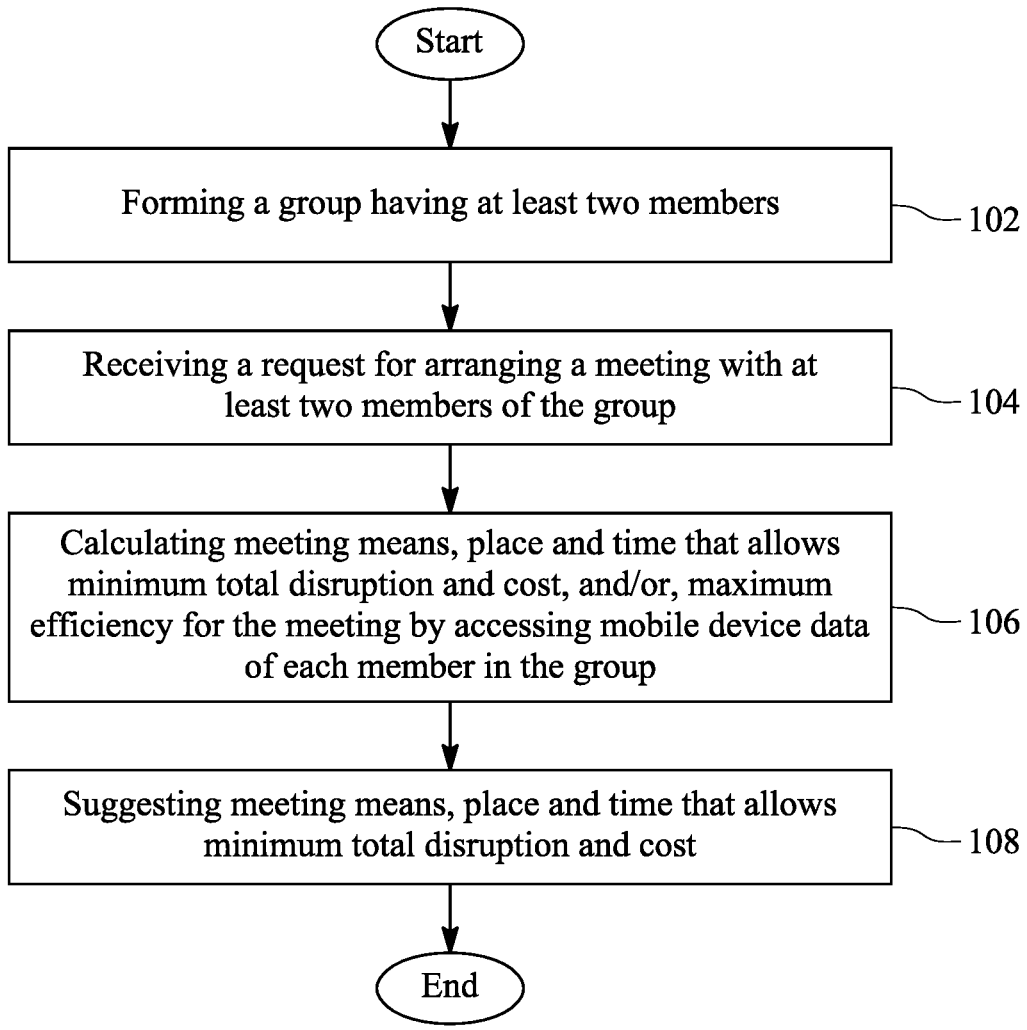
FIG. 1 illustrates an inventive embodiment 10 of a flow chart showing a method for arranging a meeting.

FIG. 1 illustrates an embodiment 10 of a flow chart showing a method for or arranging a meeting with minimum total disruption and cost. The method could be implemented in a system identical or similar to embodiment 20, 50, 80 and 110 in FIG. 2A, FIG. 5A, FIG. 8A, and FIG. 11, respectively, for example. The end-user of the method could use a user interface identical or similar to that disclosed with embodiment 30, 60, 90, 120 and 130, in FIG. 3, FIG. 6, FIG. 9 and FIG. 12, FIG. 13, respectively.

In phase 102, the cloud based intelligent secretary application allows user(s) to form a group having at least two members. In an example, the cloud based intelligent secretary application presents a contact list for user(s) to select to be included in the group. The users are enabled to select one or more contacts in their respective contact lists for forming a group. In response to the selection of the one or more contacts, the cloud based intelligent secretary application creates a group. In one example implementation, the cloud based intelligent secretary application provides options to name a group and provide a description for the group. The member can use these options to customize the group as per preferences for ease of identification and communication. For example, the member can form a group comprising friends from university and call it 'university friends' group to distinguish the group with other groups such as 'office friends', 'family friends' and the like. Although, the figure describes forming a group for arranging a meeting, the invention can arrange meeting without forming a group as well.

The cloud based intelligent secretary application requests the members of the group to provide access to their mobile devices. In one example, the cloud based intelligent secretary application requests the members to provide access at the time of installation of the application. In another example, the cloud based intelligent secretary application requests the members for access during the formation of the group. The request for access includes access to data sources such as, but not limited to, a cloud account, a calendar application, a contacts application, an email application, a meeting application, a location application, a reminder application, a mobile assistant application, and the like. The cloud based intelligent secretary application uses the data sources for learning, for example, to develop a knowledge base of the past or planned schedules of the user, which knowledge base can be used to schedule meetings.

In phase 104, the cloud based intelligent secretary application receives a request to schedule a meeting with at least two members of the group. The cloud based intelligent secretary application receives the request to schedule the meeting directly through the cloud based intelligent secretary application. Alternatively, the cloud based intelligent secretary application can also identify a request indirectly by going through data obtained from other applications. For example, the cloud based intelligent secretary application reads an email communication addressed to the member from another member requesting for a meeting. The cloud based intelligent secretary application interprets the email seeking for the meeting, as a meeting request.

In another example, the cloud based intelligent secretary application would read a communication in an instant message communication between the group members to plan for a meeting. The cloud based intelligent secretary application interprets the discussion to plan for meeting, as a meeting request. In response to the meeting request, the cloud based intelligent secretary application triggers a meeting scheduling operation. The cloud based intelligent secretary application provides one or more options to a requesting member to add context to the meeting request. In one example implementation, the cloud based intelligent secretary application provides options to set a topic, a place, duration and the like, for the meeting. The cloud based intelligent secretary application also provides options to meeting requestor to select one or more members as mandatory members and one or more optional members. The mandatory members are required to attend the meeting, while optional members can optionally attend. The optional members could be passive members or members that do not contribute data to the meeting and place determination.

The cloud based intelligent secretary application reads data from the data sources of each member in the group. Reading the data includes accessing information such as data related to a user. In one embodiment, when a calendar application is accessed, all events scheduled in a particular month, dates and timings of such events, and priorities associated with such events can be accessed. The events comprise meetings, interviews, holidays, journeys, birthdays, anniversaries, etc. The calendar application as described herein, may be implemented as standalone application or as a part of another application such as an email application or a social network application, such as Facebook or Instagram.

In one case, the cloud based intelligent secretary application reads the data belonging to another application from Random Access Memory (RAM) or cache memory. Further, metadata belonging to the data is also fetched in one embodiment. In another embodiment, an e-mail application is accessed to read all e-mails present in mailboxes of the members. The cloud based intelligent secretary application accesses the e-mail application. In yet another embodiment, the cloud based intelligent secretary application accesses application(s) managing location information of the members. The location data can be identified based on Global Positioning System (GPS) data, a base station identity and a Wi-Fi station identity obtained from corresponding location applications. All location data of the members including office, home, travel routes, etc., along with associated time periods may be accessed. However, this data is typically only used at the server to determine the meeting suggestions and not sent to other participants. In yet another embodiment, the cloud based intelligent secretary application accesses a hardware managing application of the mobile devices of each of the members to determine the client device capabilities for communication. All data related to the client device capabilities for meeting such as video conferencing, voice conferencing, messaging capabilities, etc., may be accessed. In yet another embodiment, the cloud based intelligent secretary application accesses a mobile assistant application to access general data or more historical data of the members in the mobile devices. All data relating to activities of the members including routine activities, travel to office, lunch time, travel to home, sports time, entertainment time, preferred mode of transport, and favorite locations may be accessed in some embodiments.

Although embodiments describing accessing applications such as calendar, email, location, hardware manager, and mobile assistant data are disclosed herein, it should be noted that other applications that can be utilized to determine user schedules can be utilized for enhancing meeting scheduling capabilities. The cloud based intelligent secretary application may also use user entered data in cases for scheduling a meeting where there is no data or insufficient data in the applications. The cloud based intelligent secretary application considers the schedule of the mandatory members with absolute importance, while the schedule of optional members is considered with a relatively lesser importance. The mandatory or optional characteristic of the participant is sometimes kept secret at the server side, so that the participants do not know who is a mandatory participant and who is an optional participant. However, in some embodiments this data is communicated to the participants. The cloud based intelligent secretary application utilizes information read from the one or more applications, to calculate the meeting means, place and time that allows the minimum total disruption and cost, and/or, maximizes efficiency for the meeting. The cloud based intelligent secretary application is configured to operate the applications based on meeting scheduling requirements. The cloud based intelligent secretary application determines schedules, location, capabilities, etc., from the information read from the data sources of the mobile device of each of the members.

In phase 106, the cloud based intelligent secretary application calculates a meeting means, place and time that allows the minimum total disruption and cost, and/or, maximum efficiency for the meeting by accessing the mobile device data of each member in the group. The cloud based intelligent secretary application utilizes Artificial Intelligence (AI) to calculate the meeting means, place and time that allows the minimum total disruption and cost, and/or, maximum efficiency for the meeting. With the knowledge gleaned from the information read from the client devices of each of the members, the cloud based intelligent secretary application identifies the location and time zones of every member for the meeting. Also, the cloud based intelligent secretary application compares schedules of every member for the meeting referring to the location and time zones, to identify a location and a time slot that suits every member for the meeting. Also, the cloud based intelligent secretary application considers hardware capabilities to determine an appropriate meeting means that every member can use for the meeting.

The cloud based intelligent secretary application refers to standard knowledge sources or available software solutions and services (not shown) to determine aspects such as locations on geographical maps, traffic patterns for the locations, time zones based on locations, distance between places, and the like. The knowledge sources can be local databases maintained by local authorities (government) or private companies (Google, Facebook, Microsoft, etc.). For example, navigation related data, such as travel times etc., could be obtained from Google via the Google Maps API (Application Programmer Interface), or a similar API. Contacts related data could be obtained directly from Facebook by utilizing the Facebook API.

The cloud based intelligent secretary application can also forecast traffic conditions and route times, secondarily using artificial intelligence based on utilizing data from the knowledge sources. This can be done by using daily traffic patterns stored in historical data and calculating expected traffic conditions and/or route times for a future time period. The cloud based intelligent secretary application also considers many aspects, such as, but not limited to, do not disturb time slots, late night slots, travel feasibilities, cost feasibilities, weather conditions affecting the traffic (road, water or air), location feasibilities, etc.

In phase 108, based on the calculation, the cloud based intelligent secretary application suggests a meeting means, place and time that allows the minimum total disruption and cost. The cloud based intelligent secretary application operates one or more applications to read the data sources. In one case, to read the calendar data for identifying an empty slot, the cloud based intelligent secretary application utilizes AI for processing of different details related to the calendar. The AI is used to process content of the calendar to read the information. Processing the content of each calendar/message includes processing of dates, time slots, words, etc., present in each calendar. Based on processing of such content, the cloud based intelligent secretary application develops an understanding or knowledge base of the schedules of a given member. In an embodiment, the cloud based intelligent secretary application continuously collects information and updates data bases and self-learning files to develop an understanding of the schedules of a user.

Consider an example of scheduling a meeting using the cloud based intelligent secretary application. A first member is based in Washington D.C. (USA) and a second member is based in New Delhi (India) and a third member is also based in Washington D.C. All the three members use iPhone®, with each member having access to their corresponding iCloud® accounts. All three members have the cloud based intelligent secretary application installed on their corresponding phones, with access provided to their iCloud® accounts. The first member requests the cloud based intelligent secretary application to arrange a meeting with the second member and the third member. In response to the request, the cloud based intelligent secretary application uses AI to initiate a meeting scheduling process. The cloud based intelligent secretary application determines locations of the members. The cloud based intelligent secretary application determines the location of the members based on the GPS coordinates, a base station identity information or Wi-Fi identify information. Based on the locations, the cloud based intelligent secretary application determines time zones of the members. The cloud based intelligent secretary application determines that since the members are located geographically far away, a face to face meeting is not feasible unless the first member and the third member, or the second member have plans to travel to New Delhi or Washington D.C., respectively, in a few days. Otherwise, the cloud based intelligent secretary application would determine (by calculation) that the face to face meeting incurs significant costs and requires disruption. The cloud based intelligent secretary application would calculate other modes of meeting means after finding that the face to face meeting is not feasible. The cloud based intelligent secretary application determines that the best meeting means would be video conferencing as all three members use iPhones® and associated data costs are low.

The cloud based intelligent secretary application then reviews calendars in each of the iCloud® accounts of the three members to identify a common time slot available for the meeting considering the time zone differences. The cloud based intelligent secretary application determines that since the time difference is around 12 hours, the meeting slots around mornings or evenings would be appropriate for a meeting. If the cloud based intelligent secretary application identifies a common available time slot for the meeting in the morning or the evening, the cloud based intelligent secretary application generates a suggestion for the meeting. The suggestion would include a meeting means (video conferencing), virtual location, time, and duration. However, if the cloud based intelligent secretary application does not find a common available time slot for the meeting in the morning or the evening, the cloud based intelligent secretary application determines time slots around morning or evening. The cloud based intelligent secretary application continues to iterate determining an appropriate time slot, until a time slot suitable for all the three members is identified. Subsequently to determining an appropriate time slot that suits for all the three members, the cloud based intelligent secretary application schedules a meeting. The cloud based intelligent secretary application then communicates a meeting invite to all three members.

Consider the above example with the difference that the second member has scheduled to travel to Washington D.C. in two days. The schedule is identified on the calendar. The cloud based intelligent secretary application identifies the travel plan in the calendar of the second member and performs calculations to schedule the meeting between the members in the Washington D.C. itself. The cloud based intelligent secretary application identifies that a face to face meeting means is feasible based on locations of all the three members. The cloud based intelligent secretary application reviews calendars of the three members to identify a common time slot available for the meeting. The cloud based intelligent secretary application considers the location of all the three members, distance between the members, traffic conditions in the city, schedules of the members in a given day, etc., in determining a best common time slot and a meeting place that would be feasible for all the three members with minimal disruptions and costs. For example, the cloud based intelligent secretary application determines a common slot around a lunch time when traffic is less likely, and a location that does not require much time for all the members to travel. The cloud based intelligent secretary application generates a suggestion for a face to face meeting, at a determined location, a given time, and duration for the meeting.

The cloud based intelligent secretary application is configured to learn also from data produced post sending meeting invitations. The cloud based intelligent secretary application records meeting acceptances, meeting declines, no responses, reschedule suggestions for meetings from users in response to the meeting requests, etc. In instances when the meeting invitation was declined, the cloud based intelligent secretary application automatically reviews the data sources to determine the reasons for declining. In one embodiment, the cloud based intelligent secretary application requests the user to provide reasons for declining a meeting. Accordingly, the cloud based intelligent secretary application reworks on meeting schedules and communicates a fresh meeting invite that is at a time, place and forum that is appropriate given the feedback. For example, if the user feedback is: "the commute is too long", the cloud based intelligent secretary application makes sure that the commute time to the location of the fresh invite is shorter. Further, the cloud based intelligent secretary application learns the reason for the declined meeting and updates the self-learning files and/or databases for future considerations/iterations.

Similarly, the cloud based intelligent secretary application may automatically review all or some data sources to determine the reasons for rescheduling the meeting for the user. The cloud based intelligent secretary application also requests the user for providing reasons for rescheduling suggestions. Accordingly, the cloud based intelligent secretary application reworks on meeting schedules and communicates a fresh meeting invite. At the same time, the cloud based intelligent secretary application learns the reason for rescheduling the meeting and updates the self-learning files and/or databases for future considerations/iterations.

The cloud based intelligent secretary application may apply such learning to user profiles, used for scheduling of future meetings. The learning may be reflected in change of weights assigned to a user for meeting scheduling purposes. For example, the user that always accepts the meeting invites might be given a higher weight since he is more flexible overall, and if there is an empty slot in his calendar, the meeting is sure to happen. The user who always declines and complains might be given a lower weight, because no matter what reads in his calendar, the meeting might nevertheless not happen on his part. In some embodiments the user weights are not disclosed to other users, but only to the user himself, and sometimes only upon request of the user himself.

Any features of embodiment 10 may be readily combined or permuted with any of the other embodiments 20, 21, 22, 30, 40, 50, 60, 70, 80, 81, 90, 100, 110, 120 and/or 130 in accordance with the invention.

Figure 2A:
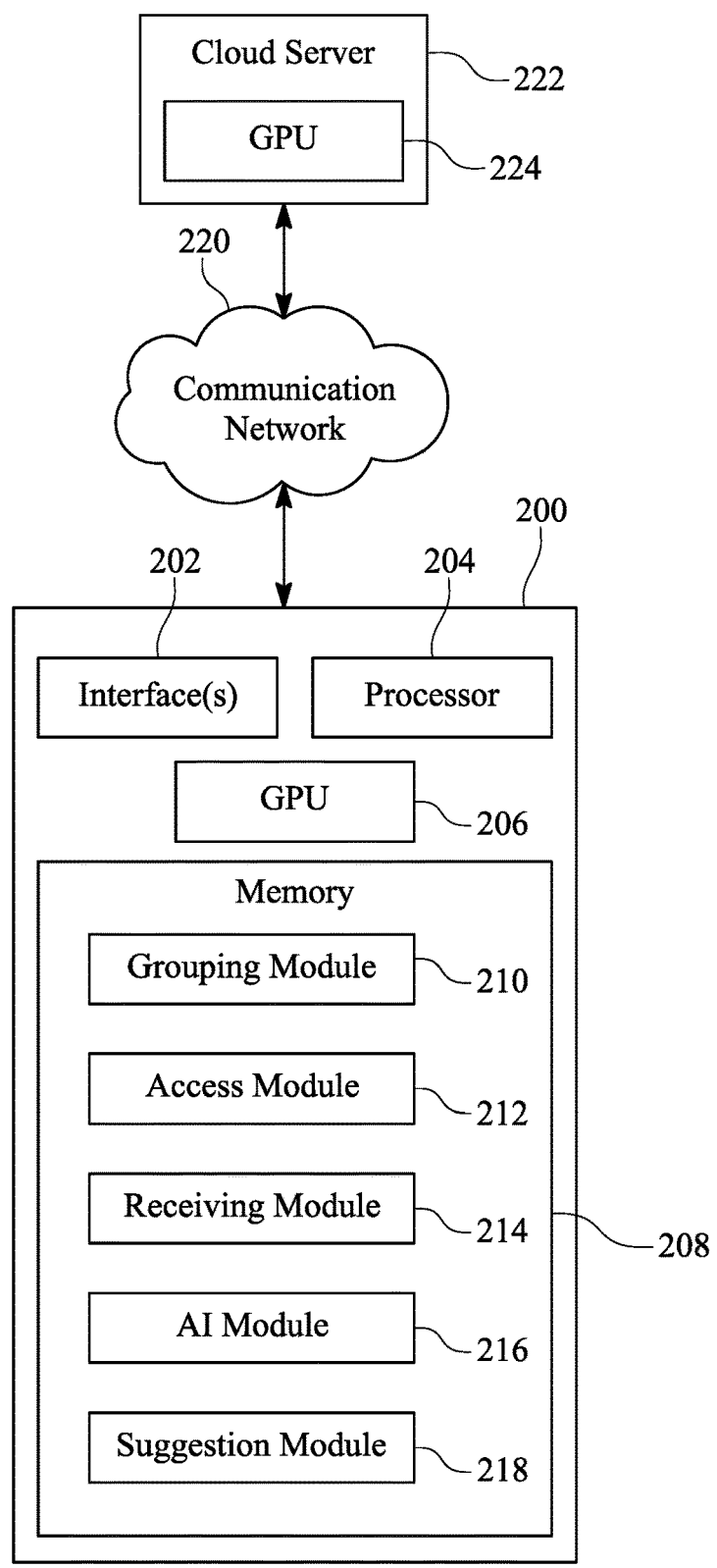
FIG. 2A illustrates an inventive embodiment 20 of a block diagram of a system 200 for executing a cloud based intelligent secretary application.

FIG. 2A illustrates an embodiment 20 of a block diagram of a client system 200 executing the cloud based intelligent secretary application. The system comprises interface(s) 202, processor 204, Graphical Processing Unit (GPU) 206, and memory 208. The memory 208 comprises a grouping module 210, an access module 212, a receiving module 214, an AI module 216, and a suggestion module 218. The client system 200 is communicatively coupled to a cloud server 222 through a communication network 220. The cloud server 222, inter alia, includes a GPU 224. The grouping module 210 is optional.

User interface(s) 202 are used to interact with or program the system 200. The interface(s) 202 may include a Command Line Interface (CLI) or a Graphical User Interface (GUI) or both. The processor 204 may refer to any one or more microprocessors, finite state machines, computers, microcontrollers, digital signal processors, logic, a logic device, an electronic circuit, an application specific integrated circuit (ASIC), a field-programmable gate array (FPGA), a chip, etc., or any combination thereof, capable of executing computer programs or a series of commands, instructions, or state transitions. The processor 204 may also be implemented as a processor set comprising, for example, a general-purpose microprocessor and a math or graphics co-processor. The processor 204 may be selected, for example, from the Intel® processors such as the Itanium® microprocessor or the Pentium® processors, Advanced Micro Devices (AMD®) processors such as the Athlon® processor, UltraSPARC® processors, microSPARC™ processors, HP® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, etc. A control unit of the client system disclosed herein is not limited to employing the processor 204. The control unit may also employ a controller or a microcontroller and other electronics components. The GPU 206 is a processor that typically has enhanced parallel processing capabilities in comparison to a microprocessor, and is therefore more suited for graphical processing, iterative computations etc., which require a lot of parallel processing. Examples of GPUs include NVIDIA GeForce® GTX, AMD Radeon HD, Nvidia Grid, etc.

The memory 208 includes a computer readable medium. A computer readable medium may include volatile and/or non-volatile storage components, such as optical, magnetic, organic or other memory or disc storage, which may be integrated in whole or in part with a processor, such as the processor 204. Alternatively, all or part of the entire computer readable medium may be remote from the processor 204 and coupled to the processor 204 or GPU 206 by connection mechanism, radio connection and/or network cable. In addition to memory 208, there may be additional memories that may be coupled with the processor 204 or the GPU 206.

The grouping module 210 of the cloud based intelligent secretary application allows user(s) to form a group having at least two members. In an example, the grouping module 210 presents a contact list for user(s) to select to be included in the group. The user(s) can select one or more contacts in the contact list for forming a group. In response to the selection of the one or more contacts, the grouping module 210 creates a group. The access module 212 of the cloud based intelligent secretary application requests the members of the group to provide access to their mobile devices. The request for access includes access to data sources such as, but not limited to, a cloud account, a calendars application, a contacts application, an email application, a meeting application, a location application, a reminder application, a mobile assistant application, and the like. The cloud based intelligent secretary application uses the data sources for machine learning, for example, to develop a knowledge base that can be used in scheduling meetings. The grouping module 210 provides options to meeting requestor to select one or more members as mandatory members and one or more optional members. The mandatory members are required to attend the meeting, while optional members can opt out. The optional members could be passive members or members that do not contribute data to the meeting and place determination.

The receiving module 214 of the cloud based intelligent secretary application receives a request to schedule a meeting with at least two members of the group. The receiving module 214 provides options to place the request to schedule the meeting. Alternatively, the receiving module 214 can intelligently identify a request by reading through data obtained from other applications. For example, the receiving module 214 reads an email communication or instant message communication addressed to the member from another member requesting a meeting. The receiving module 214 understands the request for the meeting in the communication, and proceeds to place a request for the meeting. The receiving module 214 provides one or more options to a requesting member to add context to the meeting request. In one example implementation, the receiving module 214 provides options to set a topic, a place, duration and the like, for the meeting.

Although, the grouping module 210 describes forming a group for arranging a meeting, one can appreciate that invention can arrange meeting without forming a group, for example based on entries in the phone contact directory or based on email addresses, cloud user IDs. The meeting request could be a Microsoft Outlook invite, sometimes leaving some invite parameters open, or a data entry form could be filled on the cloud based intelligent secretary application, causing the sending of an invite to an email address or a phone number, for example via text messaging, or cloud messaging such as iCloud messaging or the like.

The AI module 216 reads information from the data sources of each member in the group. Reading the information signifies accessing details such as data related to a user. Data may include schedules, metadata, applications, location, hardware data and historical data of the members in the mobile devices. The data sources may include any of the following: calendar, user profile, social networking profile, professional networking profile, etc.

The AI module 216 operates one or more applications associated with the user to read the data. In an example case of calendar, to read the data sources such as calendar to identify an empty slot, the AI module 216 processes different details related to the calendar. Processing the content of each calendar/message may include processing of dates, time slots, words, etc., present in the calendar. Based on processing, the AI module 216 develops an understanding of the schedules of a given member. In an embodiment, the cloud based intelligent secretary application continuously collects information and updates self-learning files and/or databases to develop an understanding of schedules of a user.

The AI module 216 utilizes information read from the one or more applications, to calculate the meeting means, place and time that allows the minimum total disruption and cost, and/or, maximizes efficiency for the meeting. The AI module 216 is configured to operate and/or read the applications based on meeting scheduling requirements. The AI module 216 determines schedules, location, capabilities, and the like, from the information read from the data sources of the mobile devices of each of the users participating in the meeting. Using the data collected, the AI module 216 calculates a meeting means, place and time that allows the minimum total disruption and cost, and/or, maximum efficiency for the meeting. With the knowledge gleaned from the information read from the client devices of each of the members, the AI module 216 identifies a location and a time slot that suits every member for the meeting. Also, the AI module 216 considers hardware capabilities to determine an appropriate meeting means that every member can use for the meeting.

Considering the example of selection of mandatory members and optional members for the call, the AI module 216 determines information read from the one or more applications of the mandatory members, to determine meeting schedule. The AI module 216 provides lesser consideration, or none at all, to optional members while determining meeting schedules. For example, a slot available for mandatory members may not be available for optional members in the calendars. In such situation, the AI module 216 ignores the non-availability of the optional members, and schedules a meeting to this slot. However, the meeting invitation will be sent to the one or more optional members as well.

The AI module 216 also refers to standard knowledge sources and software services (not shown) to determine aspects such as locations on geographical maps, traffic patterns for the locations, time zones based on locations, distance between places, and the like. The knowledge sources can be local databases maintained by local authorities or private companies. The data may include: traffic patterns, weather changes, demographic changes and the like. The AI module 216 may optionally forecast traffic conditions and route times, using artificial intelligence. This can be done by using daily traffic patterns stored in historical data and calculating expected traffic conditions and/or route times for a future time period. The AI module 216 may forecast traffic conditions and route times, when knowledge sources are not available. The AI module 216 may also consider any of the following: do not disturb time slots, late night slots, travel feasibilities, cost feasibilities, weather conditions affecting the traffic (road, water or air), location feasibilities and the like. Using the results of the calculation, the suggestion module 218 suggests a meeting means, place and time that allows the minimum total disruption and cost.

The AI module 216 is configured to learn from experiences post sending meeting invitations. The AI module 216 learns from meeting acceptances, meeting declines, no responses, reschedule suggestions for meetings from user in response to the meeting request, etc. In instances when the meeting invitation was declined, the AI module 216 automatically reviews the data sources to determine the reasons for declining. The AI module 216 may also request the user to provide reasons for the decline. Accordingly, the AI module 216 reworks on meeting schedules and communicates a fresh meeting invite. In some embodiments the AI module 216 learns the reason for the meeting decline, and updates the self-learning files and/or databases for future considerations/iterations.

Similarly, the AI module 216 automatically reviews the data sources to determine possible reasons or the reasons to rescheduling suggestions for the meeting from a user. The AI module 216 may also request the user to provide reasons for reschedule suggestions.

Accordingly, the AI module 216 then reworks on meeting schedules and communicates a fresh meeting invite. The AI module 216 learns the reason for the reschedule suggestion for meetings and updates the self-learning files for future considerations. The cloud based intelligent secretary application applies this machine learning also to the user profiles for scheduling of future meetings, in some embodiments. The learning may be reflected as a change in weight assigned to a user for meeting scheduling purposes.

In an embodiment, the system 200 is integrated with a cloud server 222, via a communication network 220. The cloud server 222 may comprise a CPU and/or GPU 224 or multiple CPUs and/or GPUs. The communication network 220 used for the communication in the invention is the wireless or wireline Internet or the telephony network, which is typically a cellular network such as UMTS-(Universal Mobile Telecommunication System), GSM- (Global System for Mobile Telecommunications), GPRS- (General Packet Radio Service), CDMA-(Code Division Multiple Access), 3G-, 4G-, 5G-, Wi-Fi and/or WCDMA (Wideband Code Division Multiple Access) network.

In an example, the cloud server 222 may comprise a plurality of servers (not shown). In an example implementation, the cloud server 222 may be any type of a database server, a file server, a web server, an application server, etc., configured to store data related to the cloud based intelligent secretary application and/or other applications. The cloud server 222 may also comprise a plurality of databases for storing the data files. The databases may be, for example, a structured query language (SQL) database, a NoSQL database such as the Microsoft® SQL Server, the Oracle® servers, the MySQL® database, etc. The cloud server 222 may be deployed in a cloud environment managed by a cloud storage service provider, and the databases may be configured as cloud-based databases implemented in the cloud environment.

Due to the self-learning or machine learning aspects of the invention also a neural network type of implementation for the client device 200 and/or the cloud server 222 is possible. In some embodiments both the client device 200 and/or the cloud server 222 may be realized as any of the following: SIMD (Single Instruction, Multiple Data) machine, MIMD (Multiple Instruction, Multiple Data) machine, and/or NIMD (Neural Instruction, Multiple Data) machine.

The cloud server 222 may include an input-output device such as a monitor (display), a keyboard, a mouse and/or touch screen. However, typically there is more than one computer server in use at one time, so some computers may only incorporate the computer itself, and no screen and no keyboard. These types of computers are typically stored in server farms, which are used to realize the cloud network used by the cloud server 222 of the invention. The cloud server 222 can be purchased as a separate solution from known vendors such as Microsoft, Amazon and/or HP (Hewlett-Packard). The cloud server 222 typically runs Unix, Microsoft, iOS, Linux or any other known operating system, and comprises typically a microprocessor, memory, and data storage means, such as SSD flash or Hard drives. To improve the responsiveness of the cloud architecture, the data is preferentially stored, either wholly or partly, on SSD i.e. Flash storage. This component is either selected/configured from an existing cloud provider such as Microsoft or Amazon, or the existing cloud network operator such as Microsoft or Amazon is configured to store all data to a Flash based cloud storage operator, such as Pure Storage, EMC, Nimble storage or the like. Using Flash as the backbone storage for the cloud server 222 is preferred despite its high cost due to the reduced latency it provides.

The GPU 206 or 224 may refer to an electronic circuit designed to manipulate and alter computer graphics, images, and memory to accelerate the analysis and creation of images/patterns. GPUs can be used in embedded systems, mobile phones, personal computers, workstations, game consoles, etc. The GPU 206 or 224 may be selected, for example, from AMD GPUs, Nvidia GPUs, Intel GPUs, Intel GMA, Larrabee, Nvidia Pure Video, SoC, etc. In some embodiments of the invention, typically the machine learning or Artificial Intelligence parts of the processing are configured to be executed by the GPU, due to the large number of parallel processing or comparative processing required in machine learning.

The system 200 may be configured as a mobile terminal computer, typically a smartphone and/or a tablet or alike that is used to schedule meetings of the user using operating software applications installed on the smartphone, etc. The system 200 is typically a mobile smartphone, such as iOS, Android, FireOS, a Windows Phone smartphone or any other mobile smartphone capable of executing applications. The GPU 206 or 506 present in the smartphone or GPU 224 or 524 present in cloud server 222 or 522 respectively, may process data of software applications installed on the smartphone. The processed data may be used for scheduling the meetings of the user.

However, it is also possible that the system 200 is a mobile station, mobile phone or a computer, such as a PC-computer, Apple Macintosh-computer, PDA-device (Personal Digital Assistant). The system 200 could further be a device having an operating system such as any of the following: Microsoft Windows, Windows NT, Windows CE, Windows Pocket PC, Windows Mobile, GEOS, Palm OS, Meego, Mac OS, iOS, Linux, BlackBerry OS, Google Android and/or Symbian or any other computer or smart phone operating system.

The description encompasses several modules, wherein the modules are to be interpreted as programmed instructions stored in a segment of the memory 208 or 508, which when executed by the processor 204 or GPU 206, 224 performs their functionalities.

Any features of embodiment 20 may be readily combined or permuted with any of the other embodiments 10, 21, 22, 30, 40, 50, 60, 70, 80, 81, 90, 100, 110, 120 and/or 130 in accordance with the invention.

Figure 2B:
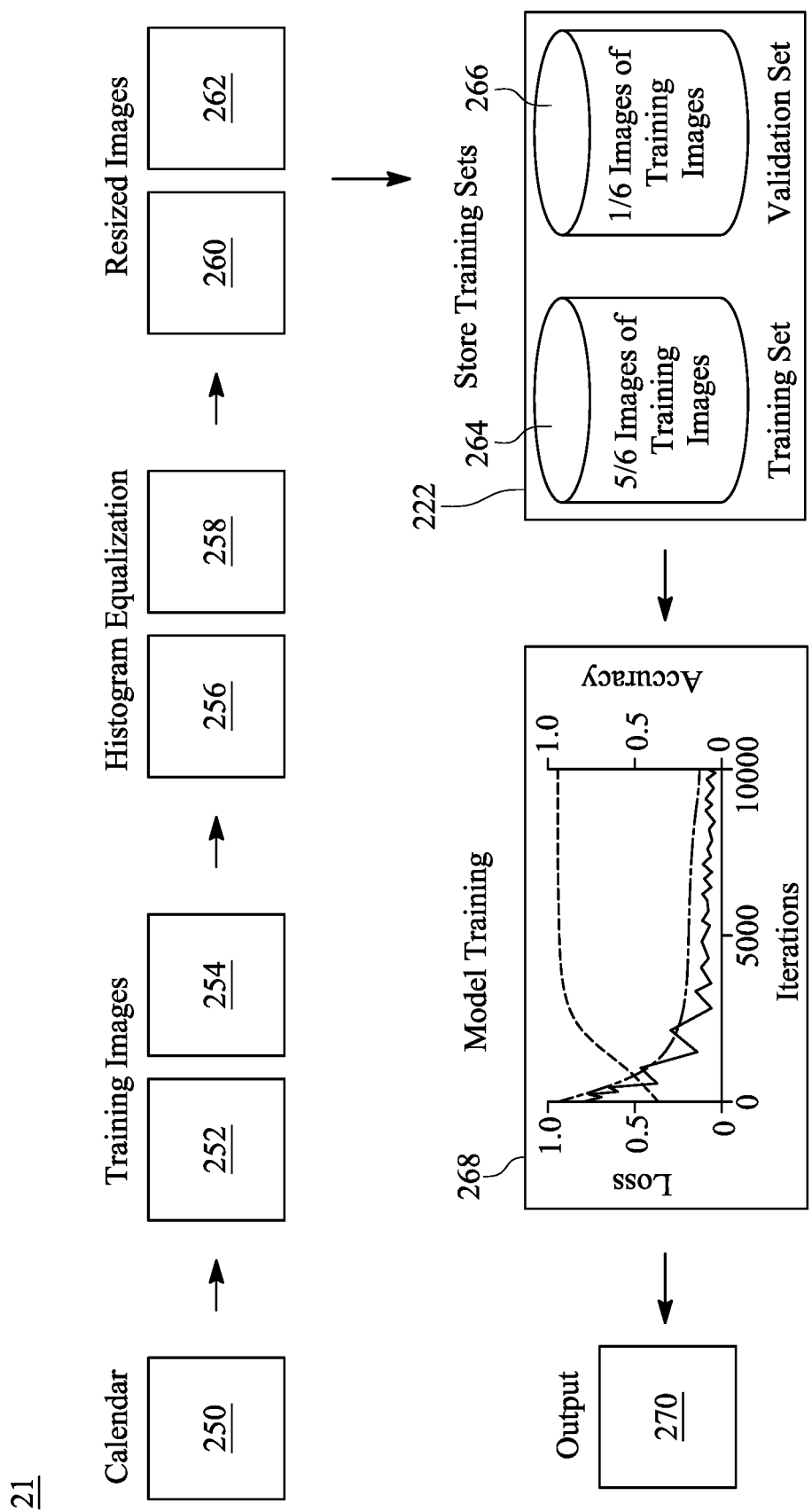
FIG. 2B illustrates an inventive machine learning embodiment 21 where artificial intelligence is used for identifying an empty slot in a calendar.

FIG. 2B illustrates a machine learning embodiment 21 where artificial intelligence is used for identifying an empty slot in a calendar, typically visually and/or semantically. This has the advantage that the APIs of different user software might not have to be fully compatible. The schedule of a user can be extracted even from a photograph of a calendar, or a scanned calendar page.

However, it is in accordance with the invention to simply read the calendar data alphanumerically, and compute a suitable free time slot for all the participants without using AI. This can be achieved for example by converting the calendars to a common data format, and searching for the free time slots from the alphanumeric data, and ranking them in order of total preference or minimum disruption and/or cost.

In the visual and/or semantic embodiment the AI module 216 accesses and operates a calendar to read and identify at least one empty slot. The AI module 216 processes the different details in the calendar. Processing the content of each calendar entry and/or message includes processing of semantic content such as dates, time slots, words, and the like, present in each calendar. Based on processing of such content, the AI module 216 develops an understanding of what time slots are free and what time slots are taken for a given member. In an embodiment, the cloud based intelligent secretary application continuously collects information, and updates self-learning files to develop an understanding of the schedules of the users.

In addition to analyzing the semantic content of calendars with AI, the calendars can be visually analyzed using AI. Consider an example of using convolutional neural networks (CNN) for recognizing a schedule in the calendar. CNN refers to artificial neural networks that model visual perception by an animal or a human. The CNN algorithms may be employed for image recognition tasks preferably emulating the way that a human secretary views a calendar in accordance with the invention. The CNN comprises multiple layers of receptive fields that are small neuron collections configured to process portions of an input image. The output of each layer is successively tiled such that the input regions overlap to obtain a representation of the original image. In an embodiment, a deep learning framework called Caffe that uses C++, MATLAB, and Python programming languages is used for implementing the CNN. Caffe is a CNN library that is configured to support both CPU and GPU operations. In this example, the GPU 206 or 224 used by the cloud based intelligent secretary application may for example be a Nvidia GPU with 15 GB RAM.

A pre-defined dataset comprising, for example, 30000 images of calendar slots are used as a training dataset for training the network. The training dataset comprises labels associated with each image. In an example, the training dataset is downloaded from Kaggle, which is a predictive modelling and analytic platform. The labelled images 252 and 254 are pre-processed and stored in a Python script format.

In this example, the GPU 206 and/or 224 executes histogram equalization on the labelled calendar images 252 and 254 of the training dataset. Histogram equalization is a technique used to adjust image intensities by using the image's histogram features. Histogram equalization enhances contrast of the calendar images 252 and 254. The images resulting after histogram equalization of the images 252 and 254 are illustrated by images 256 and 258, respectively. The GPU 206 and/or 224 performs image resizing to resize the images, for example, to a 227×227 format. Each image of the calendar slots 260, 262 is labelled and resized after performing the histogram equalization. The training dataset is then divided into 2 subsets. First subset 264 called the training set comprises $\frac{5}{6}^{th}$ portion of the training images that are used for training a model. The second subset called the validation set 266 comprises $\frac{1}{6}^{th}$ portion of the training images of calendar slots that are used for calculating and validating accuracy of the model. The subsets 264 and 266 are stored in the cloud database of the cloud server 222.

Features such as, histogram of oriented gradients (HoG), Scale-invariant feature transform (SIFT), etc., of the images are extracted from the training images 252 and 254 by using a feature extraction software such as, MATLAB. The extracted image features provide a description of features of an object present in an image 252 or 254 that are used in image classification. Once the subsets 264 and 266 are created, the GPU 206/224 generates the mean image for the training data. The GPU 206/224 subtracts the mean image from each input image of the training set 264.

The GPU 206/224 then performs feature standardization to make each feature in the dataset have a zero mean and a standard deviation of 1 such that all image data features are normalized. Feature standardization is used to ensure that measurement comparisons between features that may have different units (such as audio signals and pixel values of the image data) are normalized. In feature standardization the image features are centered on a zero mean with a standard deviation of 1. The mean image of the training set 264 is calculated. The mean image is subtracted from each image in the training set 264. The resulting value of each image is divided by its standard deviation. The resulting value of each image feature is hence normalized and can be further used for creating the training model.

The GPU 206/224 then defines the training model by selecting CNN architecture. In this example, the GPU 206/224 uses a CNN architecture model such as, Alexnet for defining the model. Alexnet is a CNN framework executed on GPUs implemented in CUDA. CUDA is a parallel computing platform and an application programming interface (API) model created by Nvidia that can be used for general purpose processing along with graphics processing.

The model is then optimized using a solver algorithm. The solver algorithm is a type of a stand-alone computer program or a software library that is configured to optimize the training model by computing an accuracy of the model using the training dataset. The solver algorithm computes the accuracy by iteratively using the validation set 266. For example, the solver algorithm may use the validation set 266 for every 1000 iterations in an optimization process of 40000 iterations that takes a snapshot of the trained model at every $5000^{th}$ iteration.

The GPU 206/224 then performs model training using the results of the solver algorithm. During the training process, the GPU 206/224 monitors losses and the model accuracy. In an example, Caffe takes a snapshot of loss and model accuracy of the trained model at every $5000^{th}$ iteration. Then the GPU 206/224 plots a learning curve of the losses as a function of the number of iterations as depicted in the graph 268 of FIG. 2B. Multiple iterations are performed until a steady-state accuracy rate is achieved. For example, as can be seen in the graph 268 the trained model achieves an accuracy rate of about 90% that stops improving after about 3000 iterations.

Once the trained model is ready, the GPU 206/224 starts predicting accuracy of unseen images from a testing dataset downloaded from a Kaggle platform. The GPU 206/224 reads an image of a calendar slot from the testing dataset, processes the image, and calculates a probability of accuracy, for example, 0 for calendar event, and 1 for an empty calendar slot. For example, if an accuracy rate of 98% is achieved, that image is considered to be of an empty calendar slot.

In one embodiment, the model is stored in the cloud database of the cloud server 222 which is accessible by the cloud based intelligent secretary application of the client device 200 via the network 220. In another embodiment, the model may be stored in the local memory 208 of the smartphone 200. The GPU 206 and/or 224 analyses an input image of a calendar slot using the model. The image of the calendar slot 250 is compared with the features of a calendar slot stored in the model. The GPU 206 and/or 224 generates an output 270 that identifies the calendar slot to be an empty calendar slot 270 if the comparison yields a high accuracy rate. In this example, the GPU 206 and/or 224 identifies that the input image is of a calendar slot that is related to an empty calendar slot. The GPU 206 and/or 224 identifies the calendar slot 270 to relate to an empty calendar slot the user has. The processor 204 may compare historical data associated with the calendar slots 270 stored in the local memory of the mobile terminal 200 or the cloud server 222 to determine that the output, calendar slots 270 are empty calendar slots. Hence, the processor 204 may determine that one of the empty calendar slots is used to schedule the meeting. By "machine learning" or "artificial intelligence" we mean that the computer system has been trained to make determinations based on a training set of samples, and/or has been tested with a validation set to have a known error rate as explained before.

Calendar slots can be classified either by analyzing them semantically, or visually as explained before. It is also in accordance with the invention to use the semantic and the visual AI analyses together to determine empty slots in calendar more accurately. The visual AI analysis as explained in the above can be applied mutatis mutandis to other secretarial tasks that would be done by the visual perception of the human secretary in accordance with the invention. For example, the visual AI analysis can be applied to reading emails, instant messages, location messages and the like. Preferably the GPU carries out the visual AI tasks, and the processor carries out the semantic AI tasks in some embodiments of the invention.

Although the example discussed herein is provided with reference to using convolutional neural networks that uses the deep learning framework Caffe, C++, MATLAB, and Python programming languages, the NVIDIA GPU, the Kaggle dataset, and the Alexnet CNN architecture model, it is to be understood that the mobile client 200 and the cloud server 222, in another embodiment, may be implemented using any other deep learning algorithm that uses any other framework, programming language, GPU, dataset, and/or architecture model. The example included herein is described with reference to the publication "A PRACTICAL INTRODUCTION TO DEEP LEARNING WITH CAFFE AND PYTHON", which is included here as a reference.

Any features of embodiment 21 may be readily combined or permuted with any of the other embodiments 10, 20, 22, 30, 40, 50, 60, 70, 80, 81, 90, 100, 110, 120 and/or 130 in accordance with the invention.

Figure 2C:
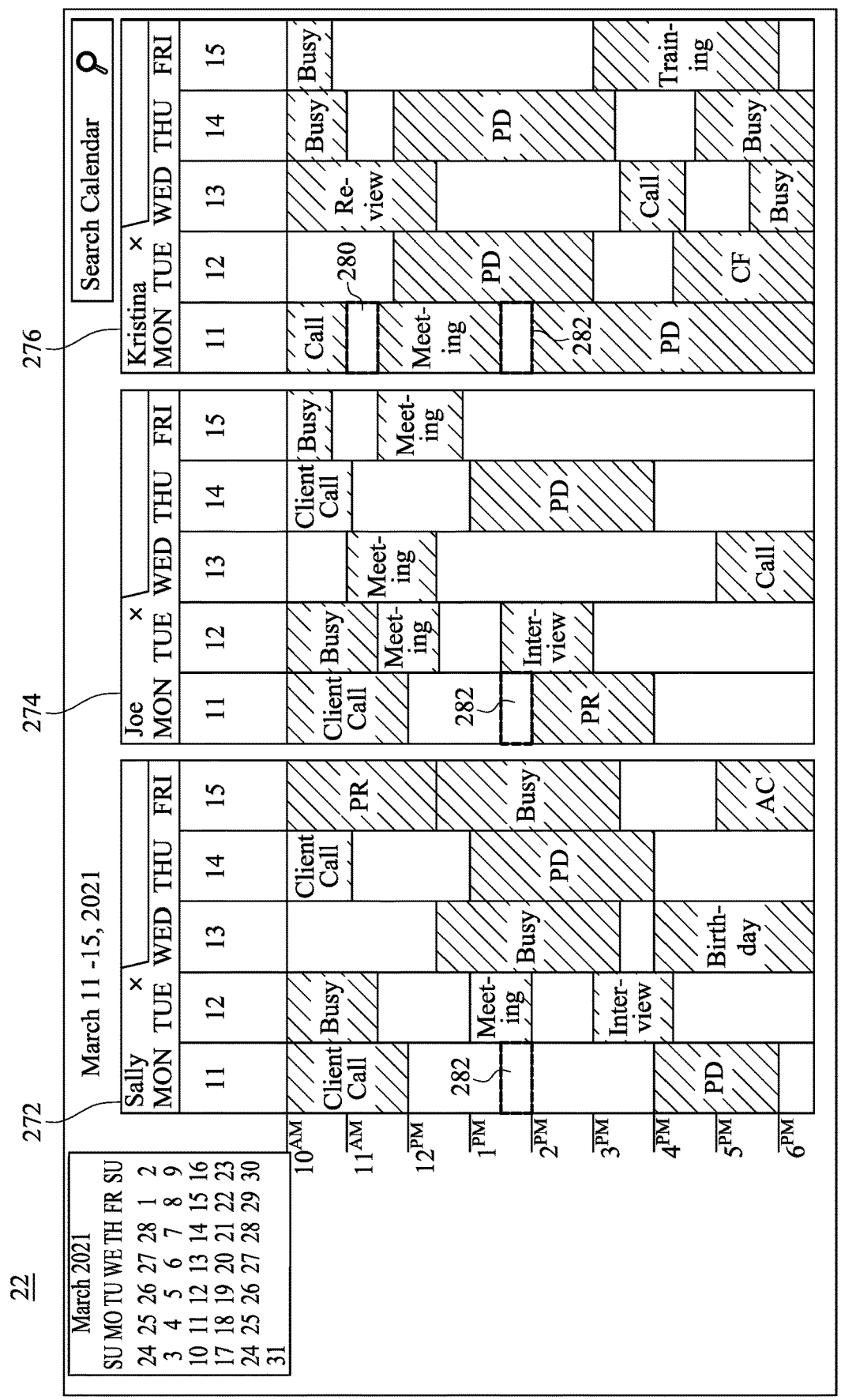
FIG. 2C illustrates exemplary calendars 22 where an inventive AI module identifies an empty slot in a calendar.

FIG. 2C illustrates exemplary calendars 22 where an AI module identifies an empty slot in a calendar. FIG. 2C illustrates calendars of Sally 272, Joe 274 and Kristina 276. The AI module 216 accesses and operates a calendar to read and identify an empty slot. When a request to schedule a meeting is placed, the AI module 216 reads the calendar details of the members. For example, when a calendar application is accessed, all events scheduled in a particular month, dates and timings of such events, and priorities associated with such events are accessed. The events may comprise meetings, interviews, journeys, birthdays, anniversaries, etc. In one example, the AI module 216 uses a scheduling assistant of the calendar to determine a common empty slot in each of the calendars. Alternatively, the AI module 216 probes the calendar by reading through the calendar for blocked and open slots of each calendars of the members. Further, the AI module 216 analyses all the collected slot information of the users to determine a common empty slot. The AI module 216 is also configured to semantically search the calendars to determine a common available slot. The AI module 216 extracts all information in the calendar including the events for a desired time frame.

The AI module 216 semantically analyzes the time slots to determine a presence of an event by processing each time slot having title, words, hyperlinks, and information. For example, the AI module 216 determines that there is an event/activity when it encounters a term 'meeting', 'discussion', etc. Other examples of terms include 'busy', '1:1', 'lunch', 'break', 'session', 'training', 'call', etc. The AI module 216 determines that a time slot at 1.30 PM for Sally, Joe and Kristina does not have any terms and thus it could be an available time slot 282. The AI module 216 determines that the slot is empty when there is no event or terms describing events in the time slot using AI as discussed in FIG. 2B. The AI module 216 also determines that the time slot 280 on Monday is available for Kristina but not for Sally and Joe.

On completion of semantic analysis of all calendars, the AI module 216 identifies a common available slot for the users. In addition to analyzing the semantic content of calendar, the AI module 216 also visually analyzes the calendar. The AI module 216 is also configured to visually search the calendars to determine a common available slot. The AI module 216 uses convolutional neural networks (CNN) for identifying events and empty slots in the calendar. As described in previous FIG. 2B, the AI module 216 may also visually analyze the calendar by processing images of calendars. Through visual processing and by virtue of training during machine learning, the AI module 216 identifies a non-available slot and empty slot. In the current example, the AI module 216 mostly encounters 'busy' or 'occupied' schedule during visual analysis for Sally, Joe and Kristina. The AI module 216 identifies that a time slot at 1.30 PM on Monday for Sally, Joe and Kristina does not have any visual indication of engagement and thus it determines that the time slot could be an available time slot.

Similarly, if the calendar files of each user are read so that the calendars entries are comparable, the empty slot on Monday at 1.30 PM can be identified by search and ranking. In this case it is the only free time slot for all participants.

Subsequent to identifying the best time slot, typically a meeting invite is sent to the intended participants of the meeting, i.e. Sally, Joe and Kristina, for example via email or text message. In this case the invite would be for the 1.30 pm Monday slot.

Any features of embodiment 22 may be readily combined or permuted with any of the other embodiments 10, 20, 21, 30, 40, 50, 60, 70, 80, 81, 90, 100, 110, 120 and/or 130 in accordance with the invention.

Figure 3:
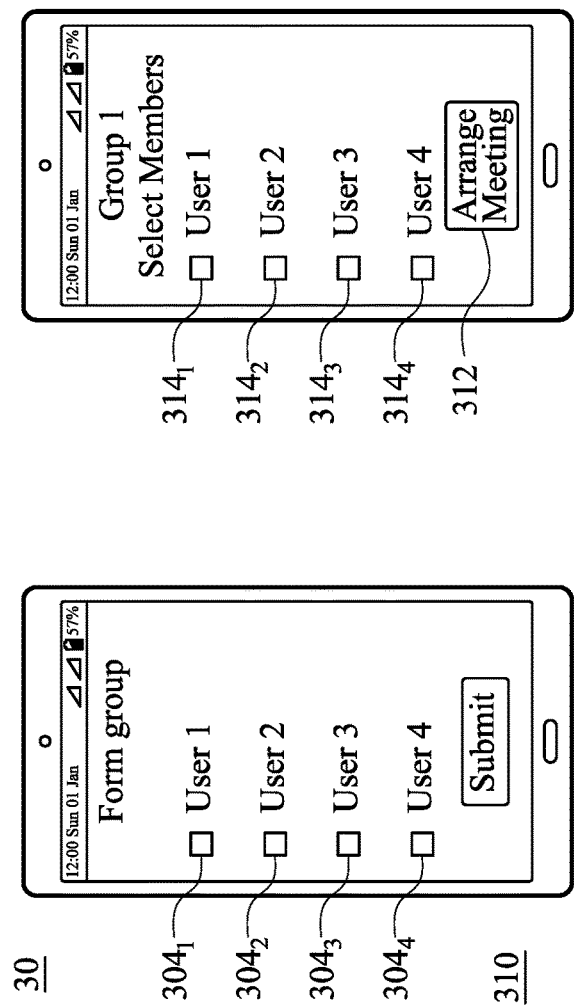
FIG. 3 illustrates an embodiment 30 of an inventive user interface showing a cloud based intelligent secretary arranging a meeting.
Figure 3:
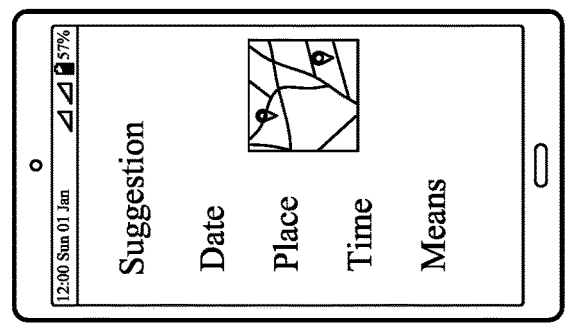
Figure 3:
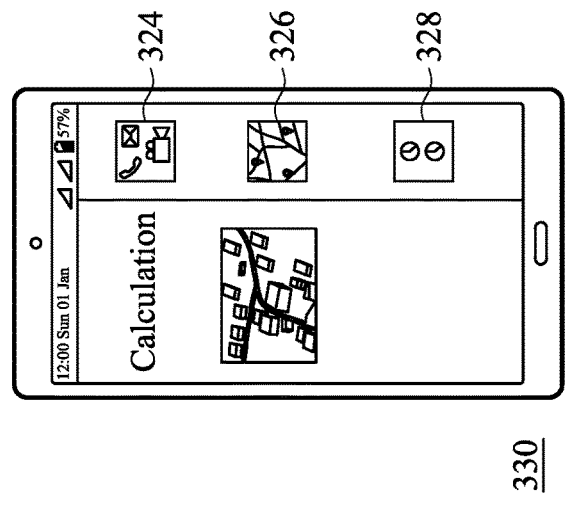

FIG. 3 demonstrates an embodiment 30 of an inventive user interface in accordance with the invention as a screen shot diagram. The user interfaces show the cloud based intelligent secretary application operating another application. The user interfaces could be displayed for example on a display screen of a mobile client device e.g. a smartphone.

The cloud based intelligent secretary application is stored on a non-transient memory medium i.e. the memory 208 of the system i.e. the mobile client device 200 and the cloud server 222. The cloud based intelligent secretary application can also be distributed between the memory 208 of the mobile client device 200 and the cloud server 222, so that some parts of the cloud based intelligent secretary application reside in the memory 208 and some parts of the cloud based intelligent secretary application reside on the cloud server 222.

FIG. 3 illustrates example user interfaces that are generated in response to a member directly requesting for a meeting, for example by selecting a user they want to meet with by ticking e-g- box $304_1$, if they want to meet with User 1. Similar interfaces may be generated in response to identification of meeting plans via an instant messaging or email. In an embodiment, an interface 310 is shown to include the cloud based intelligent secretary application operating another application, that is, a contacts application. In response to a member request to form a group, the grouping module 210 of the cloud based intelligent secretary initiates a grouping operation. The cloud based intelligent secretary accesses the contact application. The cloud based intelligent secretary application provides the member, an interface 320 having a contact list comprising one or more user's $304_{1-N}$, to choose from for the group. The interface 310 also illustrates a submit button to submit the selection of the users for the group. The grouping module 210 forms the group in response to submission of the selection of the users. Forming a group is optional.

Although formation of group is disclosed herein, the cloud based intelligent secretary application can arrange for a meeting with users without forming a group as well. For example, the invite could be sent to a potential meeting participant based on a selection from the mobile phone contact directory, social network, messaging software, social messaging software, such as WhatsApp or the like, and/or corporate communication software, such as Microsoft Teams.

The receiving module 214 provides an option in response to formation of the group. In interface 320, the grouping module 210 provides option to select one or more members 314$_{1-N}$ of the group (Group 1) to arrange the meeting. The receiving module 214 provides an 'arrange meeting' option 312 in response to selection of at least two member 314$_{1-N}$ is selected by the member. In response to selection of the arrange meeting option 312, the AI module 216 performs calculation to determine the meeting means, place and time that allows the minimum total disruption and cost, and/or, maximum efficiency for the meeting by accessing the mobile device data of each member in the group. In cases where the group already exists, the member can simply initiate a meeting request using the arrange meeting option 312. In some cases, an existing group can be modified to include or remove members as per the meeting requirements.

FIG. 3 illustrates an example that shows an interface 330 that is presented during a calculation phase. The interface 330 illustrates a dynamic interface that shows candidate meeting means, place and time identified through various interface elements during the calculation. As illustrated in the current example, a map is shown indicating locations of the members of the group. An example user interface element indicating various meeting means 324 that includes voice call, messenger and video conference is illustrated as the calculation is in progress. Similarly, a user interface element meeting location 326 is illustrated showing candidate indicative locations for the meeting location. Further, a user interface element indicating candidate meeting time with time zones 328 is illustrated. Interface 340 illustrates an example indicating a suggestion when the calculation is completed. The interface 340 illustrates a meeting means, place, date and time, obtained from the calculation that met the requirements of minimum total disruption and cost, and/or, maximum efficiency. In the example, the interface 340 also illustrates a map direction for the meeting. Although FIG. 3 illustrates the cloud based intelligent secretary application providing the user interfaces that requires a user to select options through click, it can be appreciated that the cloud based intelligent secretary application is designed for ease of operating, capable of accepting voice commands, tactile commands, gesture-based commands, and the like.

Any features of embodiment 30 may be readily combined or permuted with any of the other embodiments 10, 20, 21, 22, 40, 50, 60, 70, 80, 81, 90, 100, 110, 120 and/or 130 in accordance with the invention.

Figure 4:
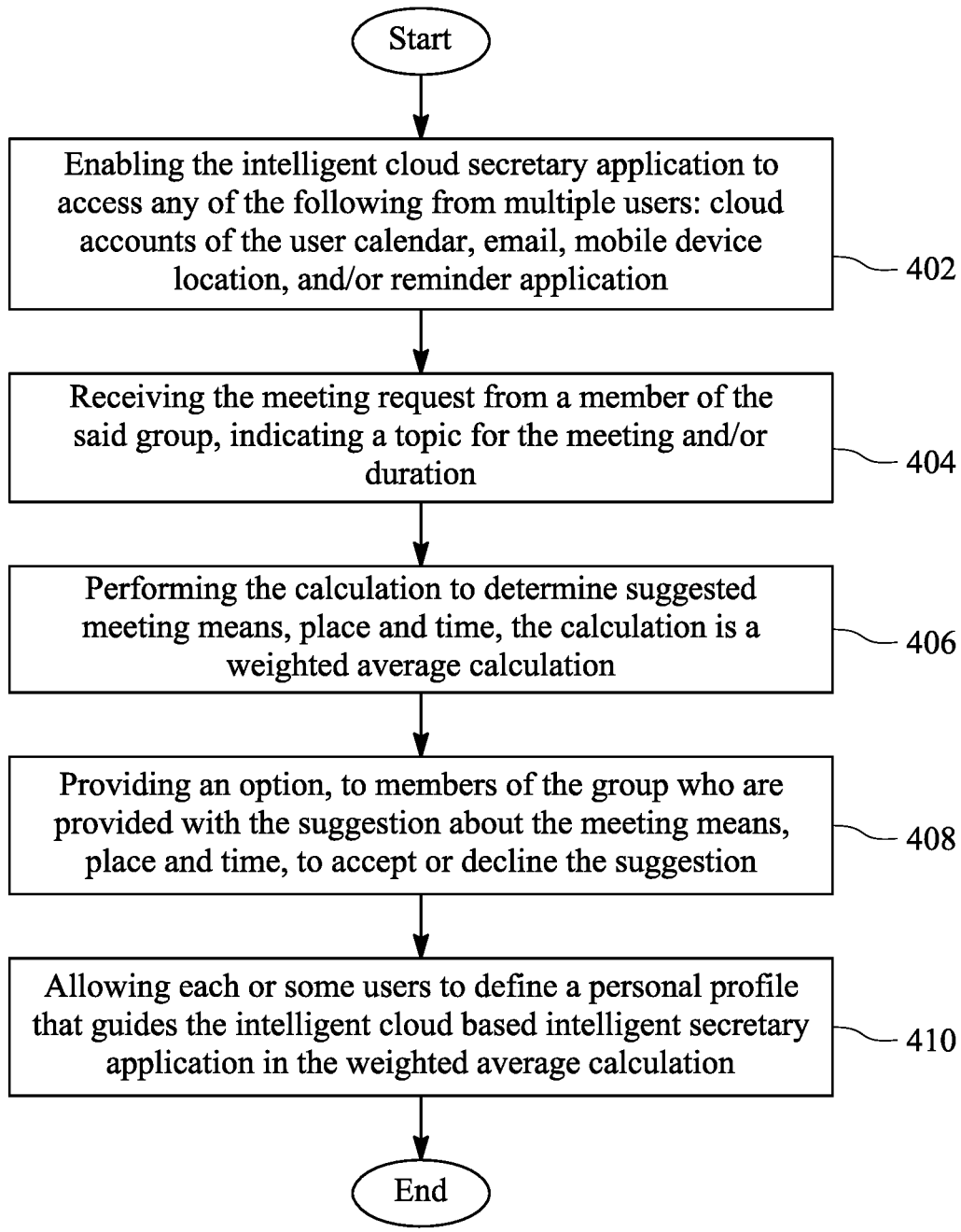
FIG. 4 illustrates an embodiment 40 of a flow chart showing an inventive method for suggesting the meeting means, place and time that allows the minimum total disruption and cost.

FIG. 4 illustrates an embodiment 40 of a flow chart showing an inventive method for suggesting the meeting means, place and time that allows the minimum total disruption and cost. The different phases/steps mentioned in FIG. 4 are not necessarily performed in the mentioned sequence but could be performed in different sequences or independently.

The cloud based intelligent secretary application replicates secretary functions of scheduling a meeting or assists a user in scheduling a meeting by operating and reading data from other software application(s) installed on the mobile client device. In phase 402, the cloud based intelligent secretary application is enabled to access the cloud accounts, calendars, email applications, mobile device locations, and/or reminder applications, from multiple users. In an example implementation, the cloud based intelligent secretary application is enabled to access applications when a permission to access the applications is obtained during first initiation of the cloud based intelligent secretary application. In another example implementation, the cloud based intelligent secretary application is enabled to access application when a permission to access the applications is obtained when a member initiates a meeting request. The cloud based intelligent secretary application accesses and obtains information from cloud accounts of the user, the calendar applications, the email applications, mobile device locations, and/or the reminder applications. The information may include, but is not limited to, schedules of the day, events, locations, time zones, routine activities, and member preferences. The information is used by the cloud based intelligent secretary application for intelligent scheduling of the meetings.

In phase 404, the cloud based intelligent secretary application receives a meeting request from a member of the said group. The cloud based intelligent secretary application provides one or more options to add context to the meeting request. In one example implementation, the cloud based intelligent secretary application provides options to set a topic, meeting duration, and the like, to set a basic context for the meeting. Although, topic and meeting duration is discussed herein, other customizable example implementations such as providing agenda, color, fonts, and the like, can be contemplated.

In phase 406, the cloud based intelligent secretary application performs calculation and determines the suggested meeting means, place and time. In an embodiment, the calculation is a weighted average calculation. The cloud based intelligent secretary application may consider a number of parameters for which weights are assigned. The AI assigns weight for each of the parameters based on various considerations. Some parameters include, but are not limited to, a profile, locations, time, meeting means, user preferences, past behaviors and cost. Considering a profile parameter, different weights may be given to different user profiles based on the user profile attributes, such as salary, cost to corporation, opportunity cost to corporation, past behavior in meetings or past behavior in scheduling meetings.

On a basic level, all people are given equal weights. So when there is no group formed, or 2 mobile phone users simply initiate and/or enable the cloud based intelligent secretary application to explore a meeting, the two users and their profiles are provided equal weights as a starting or default assumption.

However, the cloud based intelligent secretary can be used to facilitate meetings also in corporate, military or government hierarchies, where different people may have very different weights assigned to their user profiles. The people within corporate, business and/or public service may be given different weights based on their professional ranks, importance, and profile time requirements. For example, a Chief Executive Officer (CEO) of an organization would be given higher weight as compared to an executive in the same organization. For example, a president of a country would be given a highest weight in comparison with any other profiles in the government. Similarly, a chief executive of a company could be given a high weight but lower than that of weight given to the president of a country. Medical professionals, bureaucrats, government officials, pop music stars might also have high weight compared to other profiles. In some social embodiments, the user profile weight correlates with the number of followers on social network. In some corporate embodiments, the user profile weight might correlate with professional qualifications, professional position, professional accreditation, salary, cost to company, opportunity cost to company and the like.

The cloud based intelligent secretary application also considers the weights assigned based on past user behavior. For example, a user who generally accepts the meeting invitation will be given higher weight as compared to a user who declines or requests for meeting rescheduling. The cloud based intelligent secretary application provides more priority to profiles with high weights during calculations. For example, a meeting with the president of a country could supersede all other meetings and priorities. If required, existing meetings of a member can be canceled to accommodate the meeting with an extremely high weight person like the president.

Also, the cloud based intelligent secretary uses the user behavior data broadly. If a user behaves terribly within a group, this might be used to lower the profile weight of that user outside the group where the terrible behavior occurred, i.e. in making decisions in scheduling calls in other groups, or without any predefined group.

Consider a location parameter, some places are well connected while some places are not. Some places are located in congested areas, while some other places are not. Some are important places, such as parliament, hospitals, etc., while other places may not be as important, such as a hotel, sports arena, park, etc. The cloud based intelligent secretary application may provide more weight to places for meeting that are well connected, places that are of importance, and like, as compared to places located in congested locations, places having traffic issues around the location and the like. Considering a time parameter, the cloud based intelligent secretary application provides more weight to time slots during non-peak hours for arranging meeting as compared to arranging meeting at peak traffic hours. Considering the meeting means factor, the cloud based intelligent secretary application provides more weight to face to face meeting, followed with video conference, audio conference, instant messaging and email communication. The cloud based intelligent secretary application provides weight to the user preferences parameter over other parameters. Furthermore, the cloud based intelligent secretary application also enables the users to manually apply weights in some embodiments. For example, the user can apply "make the meeting happen" weight to drive the cloud based intelligent secretary application to place highest priority to determine and schedule a meeting at all costs, even if it leads to cancellations for the user. Some relationships or professional relationships might also be defined so that the booking of meetings by a certain person is always allowed and leads to the approval of the meeting time, for example an attorney could specify that the cloud based intelligent secretary application always confirms the meetings when requested by a judge.

Although one or more parameters are described herein, it can be appreciated that many other factors not described here can also be used. The cloud based intelligent secretary application uses one or more parameters in performing for example a weighted average calculation. The cloud based intelligent secretary application provides a meeting schedule suggestion including the meeting means, place and time, that allows the minimum total disruption and cost, based on the aforementioned calculation.

The cloud based intelligent secretary application manages the meetings based on the weights of the parameters. The cloud based intelligent secretary application manages a hierarchy of parameters and its weights. The cloud based intelligent secretary application uses the hierarchy of parameters and its weights in scheduling the meetings. For example, suppose the cloud based intelligent secretary application would have scheduled a meeting 'A' with a financial advisor. The user may receive a communication from a CEO of his organization for a discussion for the same meeting slot. The cloud based intelligent secretary application understands that the meeting with the CEO is much more important than meeting with the financial advisor. The cloud based intelligent secretary application has the understanding based on the hierarchy listed in its database, and from learning. The cloud based intelligent secretary application cancels the meeting with the financial advisor and schedules a meeting with the CEO. Taking the point of view further, in some embodiments if the user receives an invitation to meet the president of the country for a discussion, the cloud based intelligent secretary application cancels the meeting with the CEO and accommodates the meeting schedule with the president. The cloud based intelligent secretary application understands that the meeting with the president takes higher precedence based on weight. At the same time, the cloud based intelligent secretary application would analyze the schedules of the user, CEO and the financial advisor to determine alternate slots for the rescheduling of meetings. The cloud based intelligent secretary application would again apply the weights to determine best slots for CEO and the financial advisor. The above example illustrates application of weights by the cloud based intelligent secretary application using the profile parameter. It should be appreciated that the cloud based intelligent secretary application can also use location, time, meeting means, user preferences, past behaviors and cost parameters, individually or in combination while applying the weights to schedule the meeting. The cloud based intelligent secretary application varies the weights of the parameters over a period of time by learning from user preferences, user behaviors, etc.

In phase 408, the cloud based intelligent secretary application provides an option, to members of the group who are provided with the suggestion about the meeting means, place and time, to accept or decline the suggestion. Based on the response of the members, the meeting may be scheduled or rescheduled. In one example, the cloud based intelligent secretary application finalizes the meeting schedule in response to acceptance of the meeting suggestion by a majority of the members. Otherwise, the meeting suggestion is dropped, and the cloud based intelligent secretary application initiates calculation for determining another meeting suggestion. In another example, the cloud based intelligent secretary application finalizes the meeting schedule only in response to acceptance of the suggestion by all the members. Otherwise, the meeting suggestion is dropped, and the cloud based intelligent secretary application initiates a calculation for another meeting suggestion.

In phase 410, the cloud based intelligent secretary application allows each or some users to define a personal profile that guides the cloud based intelligent secretary application in the weighted average calculation. The cloud based intelligent secretary application may provide options to the user to provide information manually through a profile form provided by the cloud based intelligent secretary application. The cloud based intelligent secretary application may also build a profile information obtained from the cloud account, the email accounts, mobile assistants, and the like. Also, the cloud based intelligent secretary application provides options for the member to choose social networks such as, but not limited to, LinkedIn® 648A, Facebook® 648B, Instagram® 648C, Twitter Pinterest, and Tumblr®, to build the profile. Although, the figures describe forming a group for arranging a meeting, one or more embodiments of the invention can arrange meeting without forming a group as well. For example, the meeting invite could be shared between any of the aforementioned social network profiles, or by email or by phone number.

Any features of embodiment 40 may be readily combined or permuted with any of the other embodiments 10, 20, 21, 22, 30, 50, 60, 70, 80, 81, 90, 100, 110, 120 and/or 130 in accordance with the invention.

Figure 5A:
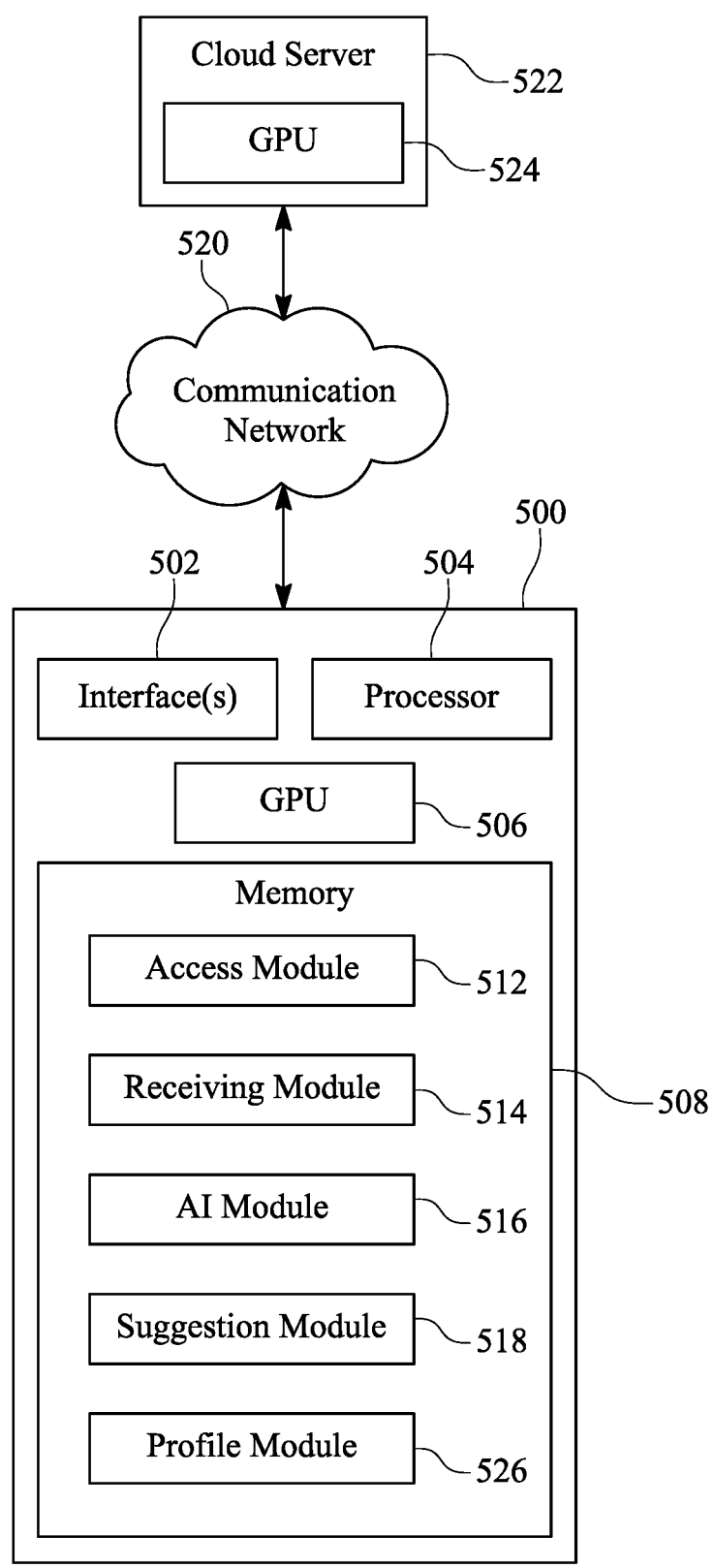
FIG. 5A illustrates an embodiment 50 of a block diagram of an inventive system 500 for executing a cloud based intelligent secretary application.

FIG. 5A illustrates an embodiment 50 of a block diagram of a system 500 for executing a cloud based intelligent secretary application.

FIG. 5A illustrates an embodiment 50 of a block diagram of an inventive system 500 executing the mobile secretary cloud application. The system comprises interface(s) 502, a processor 504, a GPU 506, and a memory 508. The memory 508 comprises an access module 512, a receiving module 514, an AI module 516, a suggestion module 518 and a profile module 526. In an embodiment, the system 500 is integrated with a cloud server 522, via a communication network 520. The cloud server 522, the GPU 524, and the communication network 520 are similar to the cloud server 222, GPU 224, and the communication network 220 of FIG. 2A respectively. Similarly, the access module 512, the receiving module 514, the AI module 516 and the suggestion module 518 are similar to the access module 212, the receiving module 214, the AI module 216, and the suggestion module 218, respectively.

The cloud based intelligent secretary application is stored on a non-transient memory medium i.e. the memory 508 of the system i.e. mobile client device 500 and the cloud server 522. The cloud based intelligent secretary application may also be distributed between the memory 508 of the mobile client device 500 and the cloud server 522, so that some parts of the cloud based intelligent secretary application reside in the memory 508 and some parts of the cloud based intelligent secretary application reside on the cloud server 522.

The access module 512 of the cloud based intelligent secretary application is enabled to access the cloud accounts of the user, a calendar application, an email application, a mobile device location application, and/or a reminder application, from multiple users. The access module 512 accesses and obtains information from cloud accounts of the user, the calendar application, the email application, mobile device location, and/or the reminder application. The information may include, but is not limited to, schedules of the day, events, locations, time zones, routine activities, and member preferences. The information may be used by the cloud based intelligent secretary application to intelligently schedule the meetings.

The receiving module 514 receives a meeting request from a member of the said group. The receiving module 514 provides one or more options to add context to the meeting request. In one example implementation, the receiving module 514 provides options to set a topic, meeting duration, and the like, to set a basic context for the meeting. Although, topic and meeting duration is discussed herein, other customizable example implementations such as providing agenda, color, fonts, and the like, can be contemplated herein.

The AI module 516 performs calculation and determines the suggested meeting means, place and time. In an embodiment, the calculation is a weighted average calculation. The AI module 516 considers a number of parameters for which weights are assigned. The AI assigns weight for each of the parameters based on various considerations. Some parameters include, but are not limited to, a profile, location, a time slot, meeting means, user preferences, user past behavior and cost. The AI module 516 provides more priority to profiles with high weights during calculations. For example, a meeting with a CEO of company may supersede all other meetings and priorities. If required, existing meetings of a member can be canceled to accommodate the meeting with the CEO. The AI module 516 also considers the weights assigned based on past user behavior. For example, a user who generally accepts the meeting invitation will be given higher weight as compared to a user who declines or requests for meeting rescheduling.

Similarly, the AI module 516 may provide more weight to places for meeting that are well connected, places that are of importance, and like. Places in congested location, places having traffic issues around the location and the like, are given lower weights. Also, the AI module 516 provides more weight to time slots during non-peak hours for arranging meeting as compared to arranging meeting at peak traffic hours. Also, for meeting means factor, the AI module 516 may provide more weight to face to face meeting, followed with a video conference, an audio conference, an instant messaging and an email communication. In addition, the AI module 516 may provide weight to the user preferences parameter over other parameters. The suggestion module 518 of the cloud based intelligent secretary application provides a meeting schedule suggestion including the meeting means, place and time, that allows the minimal disruption and cost, based on the aforementioned calculation.

The suggestion module 518 provides an option, to members of the group who are provided with the suggestion about the meeting means, place and time, to accept or decline the suggestion. Based on the response of the members, the meeting may be scheduled or rescheduled. In one example, the AI module 516 finalizes the meeting schedule in response to a majority of the members accepting the suggestion. Otherwise, the suggestion is dropped and the AI module 516 initiates calculation for another suggestion. In another example, the AI module 516 finalizes the meeting schedule only in response to acceptance of the suggestion by all the members. Otherwise, the suggestion is dropped and the AI module 516 initiates a calculation for another suggestion.

The profile module 526 allows each or some users to define a personal profile that guides the cloud based intelligent secretary application in the weighted average calculation. The profile module 526 may provide options to the user to provide information manually through a profile form provided by the cloud based intelligent secretary application. The profile module 526 may also build a profile information obtained from the cloud account, the email accounts, mobile assistants, and the like. Also, the profile module 526 provides options for the member to choose social networks. For example, some users may use their social network profiles such as Instagram, Facebook, LinkedIn, or the like as their user profiles, or corporate communication software profiles, like that of Microsoft Teams, for the cloud based intelligent secretary application. In this embodiment the cloud based secretary application is typically interfaced with Facebook or Instagram, for example via Facebook API or Instagram API. The cloud based intelligent secretary application may evaluate a user profile weight based on the data in the user profile. Further, this weight may be updated and reviewed based upon historical meeting interactions recorded by the cloud based intelligent secretary application. Typically, if the person has a past tendency to reschedule and/or miss meetings, or be late from meetings, the user profile weight is revised down, whereas punctuality and adherence to the timing of previously agreed meetings increases the user profile weight.

Although, the figures describe forming a group for arranging a meeting, it is in accordance with the invention that a meeting can be arranged without forming a group, typically based upon telephone numbers, email addresses and/or user IDs. It is in accordance with the invention that a meeting set-up request can be sent to anyone via email or for example SMS- or MMS-messaging. The message will be understood by the cloud based intelligent secretary application, if this application is already installed on the receiver device. Typically, the cloud based secretary app typically requests the operating system, such as Android or iOS to allow permission to read messages and/or emails. However, the message is typically configured to invite the recipient to install the cloud based secretary application, if it is not installed on the recipient device. Typically, the cloud based secretary app is downloadable from App store, Google Play or the like app store, such as Microsoft store.

Any features of embodiment 50 may be readily combined or permuted with any of the other embodiments 10, 20, 21, 22, 30, 40, 60, 70, 80, 81, 90, 100, 110, 120 and/or 130 in accordance with the invention.

Figure 5B:
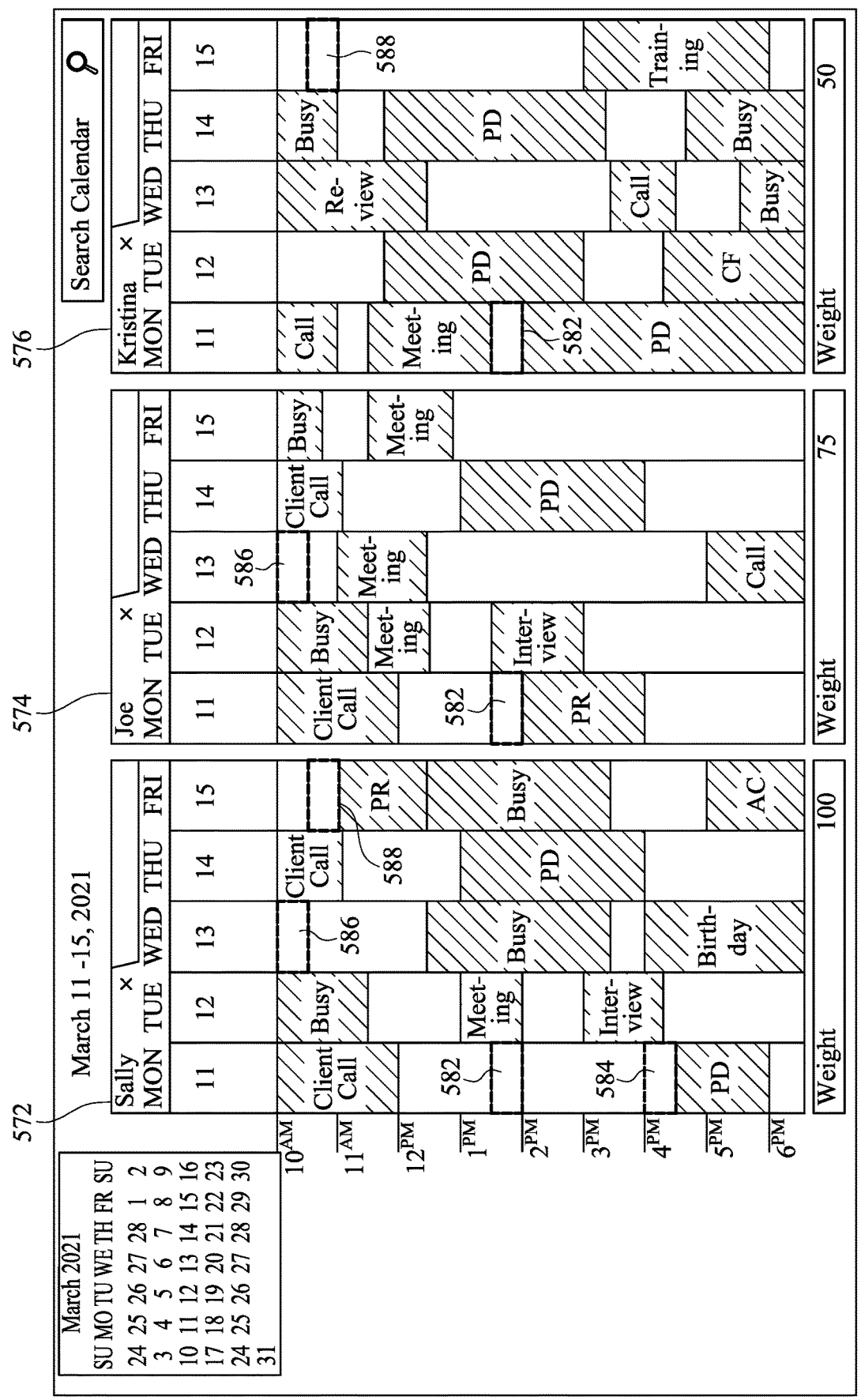
FIG. 5B illustrates exemplary calendars and a weighted average calculation used in the inventive system embodiment 50.

FIG. 5B further illustrates the embodiment 50 providing exemplary calendars and a weighted average calculation. FIG. 5B illustrates three calendars Sally 572, Joe 574 and Kristina 576. Sally is the boss of Joe and Kristina. The cloud based intelligent secretary application understands that Sally is the boss of Joe and Kristina based on analysis of their profiles. The profiles may reveal their professional ranks in an organization and reporting structure. Thus, the cloud based intelligent secretary application assigns a weight of 100 for Sally. Further, the cloud based intelligent secretary application also understands that Joe is a senior resource positioned in a management role. Therefore, the cloud based intelligent secretary application assigns a weight of 75 to Joe. The cloud based intelligent secretary application understands that Kristina reports to Sally and further reports to Joe under matrix reporting. As a result, the cloud based intelligent secretary application assigns a weight of 50 to Kristina. The calendars display various activities and/or events through the week. Each event may have a pre-defined value or the application/manually applied dynamic value.

A brief look at Sally's calendar reveals various activities/events planned for a work week. The AI module 516 identifying an empty slot in a calendar, typically visually and/or semantically. The schedule of a user can be extracted even from an image of a calendar, or a scanned calendar page. Also, in accordance with the invention, the cloud based intelligent secretary application can be configured to simply read the calendar data alphanumerically, and compute a suitable free time slot for all the participants without using AI. This can be achieved for example by converting the calendars to a common data format, and searching for the free time slots from the alphanumeric data.

The activities/events include Product Development (PD), a meeting, an interview, a Product Review (PR), a birthday celebration, a client call, a performance review activity, and an anniversary celebration event. Similarly, Joe's and Kristina's calendars include various activities/events lining their calendars. The cloud based intelligent secretary application applies weights to each of such activities/events. The weights may be relative or absolute in nature. The cloud based intelligent secretary application recognizes that activities/events such as a client call and a PD are very important. Similarly, the cloud based intelligent secretary application recognizes that a birthday celebration and an anniversary celebration in office are less important than the client call or the PD. In accordance with the importance, the cloud based intelligent secretary application applies appropriate weights to each of the activities/event. The below examples demonstrate weighted average calculation using profile weights, event weights, and profile and event weights.

Consider an example of weighted average calculation using weights assigned to profile. In the example, Sally wants to conduct a meeting with Joe and Kristina. Sally uses the cloud based intelligent secretary application to schedule a meeting. The cloud based intelligent secretary application analyzes the calendars of Sally, Joe and Kristina. The calendars are illustrated side-by-side in the figure. The cloud based intelligent secretary application analyzes the calendars semantically, visually or both to determine available time slots in each of the calendars.

The cloud based intelligent secretary application determines the empty time slots in the calendars semantically by simply reading the calendar data alphanumerically, and identifying a free time slot when no alphanumerical data exists in the slot. The cloud based intelligent secretary application determines the empty time slots in the calendars visually through image processing as described in FIG. 2B. Alternatively, the cloud based intelligent secretary application determines the empty time slots in the calendars visually by converting the image to machine readable format or Optical Character Recognition (OCR) format and by reading the calendar data alphanumerically to identify a free time slot. With the information on available slots, the cloud based intelligent secretary application determines a common time slot that is available for all. Recognizing that Sally has the highest weight by virtue of being an important person (boss), the cloud based intelligent secretary application applies highest significance to Sally's time preferences.

The cloud based intelligent secretary application identifies multiple time slots available in the week. In the example, the cloud based intelligent secretary application determines that options available are: option 1, 582: 1.30 PM Monday available for Sally, Joe and Kristina; option 2, 586: 10.00 AM Wednesday available for Sally and Joe; option 3, 588: 10.30 AM Friday available for Sally and Kristina. With the information on available slots, the cloud based intelligent secretary application determines a slot that is available for all. The cloud based intelligent secretary application identifies that option 1, 582 at time 1.30 PM on Monday is available for Sally, Joe and Kristina with weighted average of 82.5. The weighted average is calculated by using weights assigned to profiles, and profile weights in calculation, in one embodiment.

In the current example, the profile weight for Sally is assigned to be 50%, the profile weight for Joe is assigned to be 30% and the profile weight for Kristina is assigned to be 20%:

For the option 1, 582, the weighted average is calculated by 100 (weight assigned to Sally)*50% (profile weight)+75 (weight assigned to Joe)*30% (profile weight)+50 (weight assigned to Kristina)*20% (profile weight)=82.5.

The cloud based intelligent secretary application calculates a weighted average of 72.5 for the option 2, 586. The weighted average for option 2 586 is calculated by 100 (weight assigned to Sally)*50%+75 (weight assigned to Joe)*30% (profile weight)+0 (weight assigned to Kristina due to non-availability)*20% (profile weight)=72.5.

The weighted average for option 3, 588 is calculated by 100 (weight assigned to Sally)*50% (profile weight)+0 (weight assigned to Joe due to non-availability)*30% (profile weight)+20 (weight assigned to Kristina)*20% (profile weight)=60.

Clearly, the cloud based intelligent secretary application identifies that option 1, 582, has the highest weighted average of 82.5 followed with the option 2, 586 (72.5) and the option 3, (62). The cloud based intelligent secretary application identifies the option 1 582 as the optimum slot, followed with the other options. Accordingly, the cloud based intelligent secretary application provides all the options to the user with option 1, 582 being on top of the suggestions. Sally, Joe and Kristina can select one of the suggestions for the meeting. In one embodiment, the meeting suggestion option that gets most user selections is finalized as the final meeting slot. In situations such as the option 2, 586, the cloud based intelligent secretary application realizes that Joe is not available for meeting. The cloud based intelligent secretary application considering the importance of user Sally may cancel the Joe's existing activity or may reschedule the existing activity to accommodate the Sally's meeting request.

Consider an example of weighted average calculation using weights assigned to events. Using the weights assigned to activities/events, the cloud based intelligent secretary application schedules for meetings. Important activities/events are assigned more weight as compared to less important activities/events. For example, a meeting event with CEO has a higher weight compared to a birthday party in office. Consider another situation where Sally wants to conduct a meeting with Joe and Kristina on an important project related matter. Sally uses the cloud based intelligent secretary application on Monday morning to initiate a meeting scheduling. Sally provides a title of the meeting as important product development meeting. The cloud based intelligent secretary application realizes that the meeting is important from analysis of the meeting title. Considering the importance of the meeting, the cloud based intelligent secretary application determines to schedule a meeting based on highest weighted value based on the event. The cloud based intelligent secretary application analyzes the calendars of Sally, Joe and Kristina. As described in previous example of analysis of the calendars of FIG. 5B, the cloud based intelligent secretary application is aware that there are multiple meeting slots available in the work week. The cloud based intelligent secretary application determines that the first available meeting slot for all the three is option 1 582: 1.30 PM Monday. The cloud based intelligent secretary application calculates a weighted average for the option 1 582 as 180. The weighted average for events is calculated by using weight assigned to an event/activity and event weight in the weighted average calculation.

Some embodiments of the invention can be realized purely by using deterministic weighting and ranking algorithms. In these embodiments Artificial Intelligence is not necessary and the machine learning is limited to algorithmic updating of weights or weighting algorithms. However, as explained before many embodiments of the invention may deploy AI to develop a model and make selections on behalf of the users based upon the analysis of that model as explained earlier, for example with the visual recognition and modelling of the calendars.

In the current example, considering the importance of the meeting, the weight assigned to the meeting is 100. For an empty time slot in the calendar for a given user, an event weight is set to be 60%. For an occupied official event time slot (for example, a client call and a PD) in the calendar, an event weight is set to be 40%. Similarly, for an occupied casual event (for example, birthday celebration and anniversary celebration) time slot in the calendar, an event weight is set to 20% One should note that this time the birthday or anniversary celebration is more important than a client call, as it repels an overbooking more than the client call:

For the option 1, 582, the weighted average based on event is calculated as: 100 (weight assigned to event)*60% (empty slot for Sally)+100 (weight assigned to event)*60% (empty slot for Joe)+100 (weight assigned to event)*60% (empty slot for Kristina)=180.

The weighted average for option 2, 586 is calculated as: 100 (weight assigned to event)*60% (empty slot for Sally)+100 (weight assigned to event)*60% (empty slot for Joe)+100 (weight assigned to event)*40% (official review meeting)=160.

The weighted average for option 3, 588 is calculated as: 100 (weight assigned to event)*60% (empty slot for Sally)+100 (weight assigned to event)*40% (Official review meeting for Joe)+100 (weight assigned to event)*60% (official review meeting)=160.

Clearly, the cloud based intelligent secretary application identifies that option 1, 582, has the highest weighted average value of 180 followed with the option 2, 586 (160) and the option 3, 588 (160). The cloud based intelligent secretary application identifies the option 1, 582 as the optimum slot, followed with other options. Accordingly, the cloud based intelligent secretary application may provide all the options to the user with option 1, 582 being on top of the suggestions, or only option 1. Sally, Joe and Kristina can select one of the suggestions for the meeting.

Then consider an example of weighted average calculation using profile weighted average and event weighted average. Consider another situation where Sally wants to conduct an important project related meeting with Joe and Kristina urgently. Sally uses the cloud based intelligent secretary application on early Monday morning to initiate a meeting scheduling process. Sally names the meeting as an urgent product development meeting. The cloud based intelligent secretary application realizes that the meeting is urgent and very important from analysis of the meeting title. Also, the cloud based intelligent secretary application understands that Sally's time is important by virtue of being a boss. The cloud based intelligent secretary application applies highest significance to the meeting considering importance of the meeting and Sally's time. The cloud based intelligent secretary application determines to schedule a meeting at earliest available slot. The cloud based intelligent secretary application analyzes the calendars of Sally, Joe and Kristina. The analysis could be performed semantically, visually or both to determine available slots. With the information on available slots, the cloud based intelligent secretary application determines one or more slots that are available for all three through the week. Since the meeting is urgent and important, the cloud based intelligent secretary application identifies multiple time slots available on Monday itself.

The cloud based intelligent secretary application determines that the first available meeting slot for all the three is option 1, 582: 1.30 PM Monday. The cloud based intelligent secretary application calculates weighted average for the option 1, 582, option 2, 586 and option 3, 588. The weighted average for events is calculated by individually calculating weighted averages using profiles and events, and further calculated by using weighted average on weighted average values obtained for the profiles and the events. Using the above two examples, the weighted average using the profile and the weighted average using the event for option 1, 582 is derived to be 82.5 and 180, respectively. Similarly, the weighted average using the profile and the weighted average using the event for option 2, 586 is derived to be 72.5 and 160, respectively. The weighted average using the profile and the weighted average using the event is derived to be 60 and 160, respectively. Using the above values, the cloud based intelligent secretary application performs final weighted average calculation. In the current example, a weight assigned for weighted average value of profile is 60% and a weight assigned for the weighted average value of event is 40%.

Using the above values, the cloud based intelligent secretary application calculates a weighted average calculation for the option 1, 582 as: 82.5 (weighted average value of profile)*60% (weight assigned to weighted average value of profile)+180 (weighted average value of event)*40% (weight assigned for weighted average of event)=121.5.

For the option 2, 586, the weighted average calculation is performed as: 72.5 (weighted average value of profile)*60% (weight assigned to weighted average value of profile)+160 (weighted average value of event)*40% (weight assigned for weighted average of event)=107.5.

Similarly, for the option 3, 588, the weighted average calculation is performed as: 60 (weighted average value of profile)*60% (weight assigned to weighted average value of profile)+160 (weighted average value of event)*40% (weight assigned for weighted average of event)=100.

The cloud based intelligent secretary application identifies that option 1, 582, has the highest weighted average value of 121.5 followed with the option 2, 586, (107.5) and the option 3, 588, (100). The cloud based intelligent secretary application identifies the option 1, 582 as the optimum slot, followed with other options. Accordingly, the cloud based intelligent secretary application provides all the options to the user with option 1, 582, being on top of the suggestions.

Any features of embodiment 50 may be readily combined or permuted with any of the other embodiments 10, 20, 21, 30, 40, 60, 70, 80, 81, 90, 100, 110, 120 and/or 130 in accordance with the invention.

Figure 6:
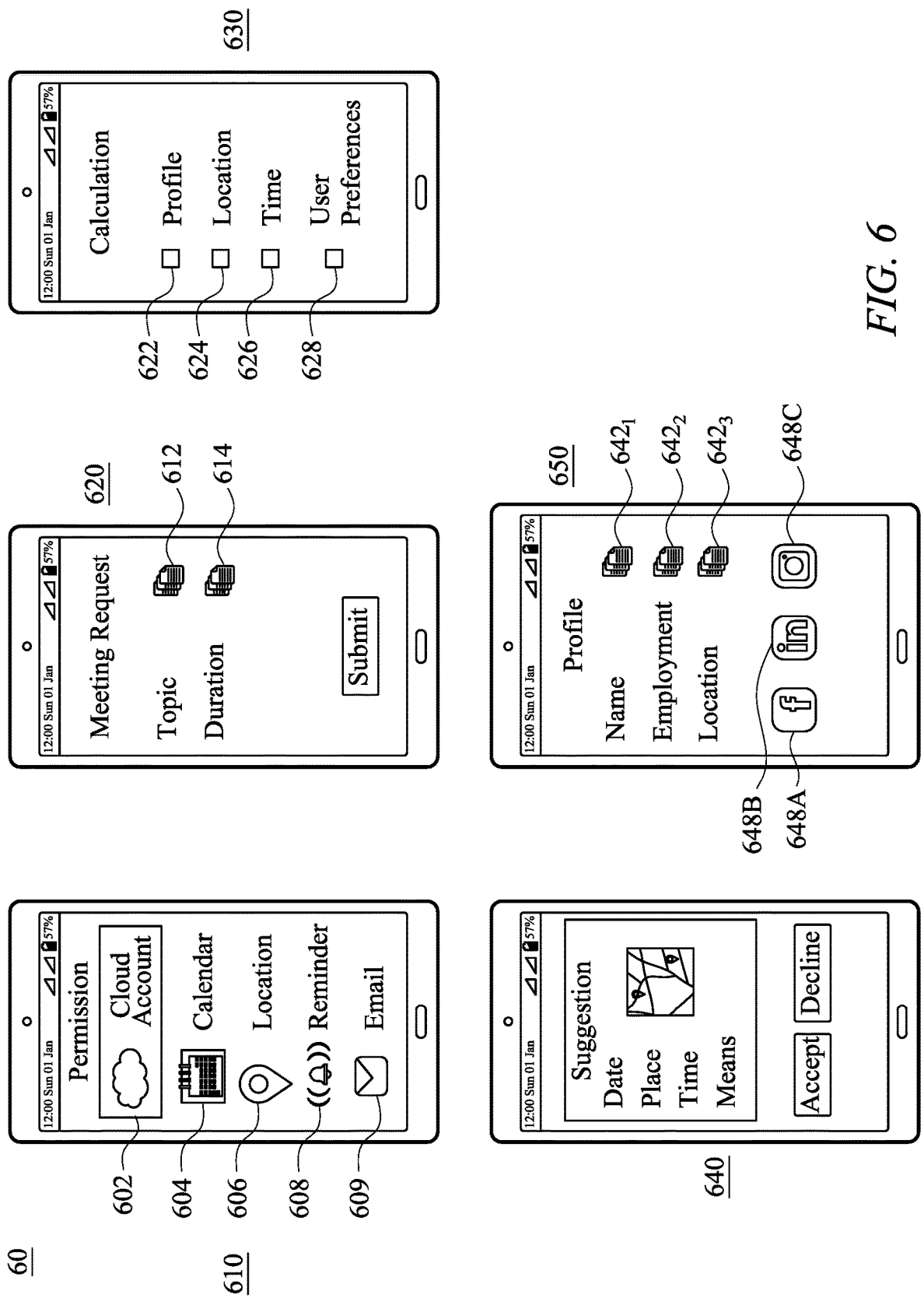
FIG. 6 demonstrates an embodiment 60 of an inventive user interface showing a cloud based intelligent secretary providing a meeting suggestion.

FIG. 6 demonstrates an embodiment 60 of inventive user interfaces 610, 620, 630, and 640 in accordance with the invention as a screen shot diagram. The user interfaces show cloud based intelligent secretary application operating another application. The user interfaces could be displayed for example on a display screen of a mobile client device i.e. a smartphone.

FIG. 6 illustrates exemplary user interfaces that are generated for accessing sources, meeting request, during calculation, providing options and creating profiles. In an embodiment, the user interface 610 is shown where the cloud based intelligent secretary application seeks permissions for accessing various applications. In current example, request to access data sources such as a cloud account application 602, a calendar application 604, a location application 606, a reminder application 608, and an email application 609 are shown. The user can click on each of the sources to grant permissions. In response to the user providing permission to access the one or more aforementioned applications, the access module 512 accesses the applications for which permissions are obtained.

The user interface 620 illustrates a meeting request. In response to receiving a meeting request, the receiving module 514 provides options to add basic context to the meeting such as topic option 612 and a duration option 614. An interface 630 illustrates some aspects that are considered for calculations such as profile 622, a location 624, a time 626, and user preferences 628. In an embodiment, AI module 516 uses weighted average calculation to determine the meeting means, the meeting place and the meeting time based on one or more of the profiles 622, the location 624, the time 626 and the user preferences 628. Although only four aspects are shown here for the sake of explanation brevity, other aspects such as traffic conditions, history of user, travel feasibility, and the like, can be used to calculate weights.

The suggestion module 518 provides a suggestion in response to the calculation. The user interface 640 illustrates an example suggestion when the calculation is completed. An option 640, to accept or decline the suggestion is provided to the members. Based on the response of the members, the meeting is scheduled. As discussed above, various parameters are considered for weighted average calculation. One important option that is considered for weighted average calculation is the user profile. An interface 650 illustrates options to allow each or some users to define a personal profile that guides the cloud based intelligent secretary application in the weighted average calculation. The cloud based intelligent secretary application provides a user with a profile form to provide information manually via data fields 6421-642N. The interface 650 also illustrates options for the member to choose social network profiles such as social profile 648A, social profile 648B and social profile 648c, to build the user profile. These profiles may correspond to any of, but not limited to, LinkedIn®, Facebook®, Instagram®, Twitter®, Pinterest®, and Tumblr®. In some embodiments these user profiles can be used as user profiles in scheduling meetings in accordance with the invention.

Consider an example of scheduling a meeting using the cloud based intelligent secretary application. A group may include five members located in Washington D.C. (USA) with a first member being a chief of a company. The first member initiates the cloud based intelligent secretary application in his mobile device for arranging a meeting with the other four members. In response to the request, the cloud based intelligent secretary application initiates a meeting scheduling process. In the process, the cloud based intelligent secretary application determines a location of the members.

Based on the locations, the cloud based intelligent secretary application determines that the members are in same city. Being aware that the first member is a chief of a company, the cloud based intelligent secretary application provides highest weight to location and time of the first member. The cloud based intelligent secretary application determines that a face to face meeting would be a best means of meeting due to geographical location proximity of the users. The cloud based intelligent secretary application reviews calendars of the members to identify a common time slot available for the meeting. The cloud based intelligent secretary application preferably applies more weights on time slots that are not in peak traffic hours. Also, the cloud based intelligent secretary application preferably weights for meeting place at the first user place or in close proximity to the user place to avoid delays. The cloud based intelligent secretary application performs weighted average calculation based on the aforementioned aspects in which the highest weight is given to the first profile due to importance of the profile and value of time of the first user.

Any features of embodiment 60 may be readily combined or permuted with any of the other embodiments 10, 20, 21, 22, 30, 40, 50, 70, 80, 81, 90, 100, 110, 120 and/or 130 in accordance with the invention.

Figure 7:
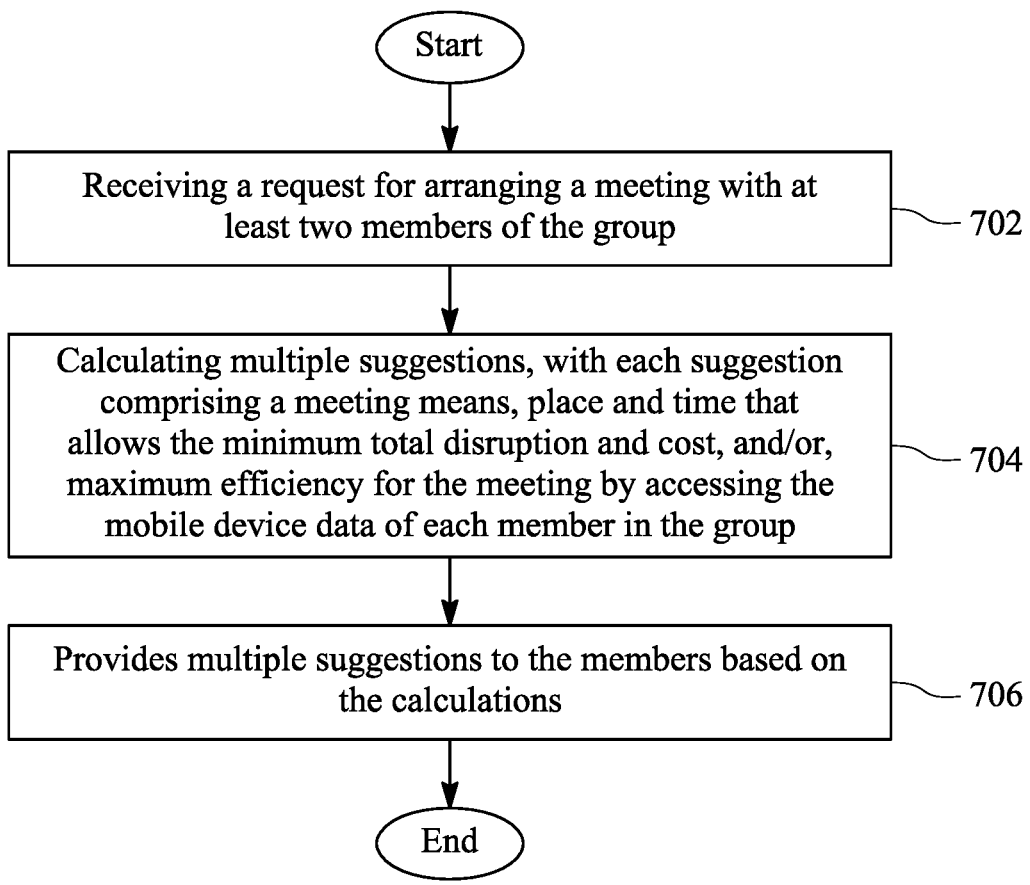
FIG. 7 illustrates an embodiment 70 of a flow chart showing an inventive method for providing multiple meeting suggestions.

FIG. 7 illustrates an embodiment 70 of a flow chart showing a method for providing multiple meeting suggestions.

In phase 702, the cloud based intelligent secretary application receives a request for scheduling a meeting with at least two members of the group. Although, the figures describe forming a group for arranging a meeting, one can appreciate that embodiments of the invention can arrange a meeting without forming a group as well. In response to the meeting request, the cloud based intelligent secretary application may trigger a meeting scheduling operation. The cloud based intelligent secretary application may provide one or more options to add context to the meeting request. In one example implementation, the cloud based intelligent secretary application may provide options to set a topic, a place, and the like, for the meeting. The cloud based intelligent secretary application reads information from the data sources of each member in the group. Reading the information signifies accessing details such as data entries related to the member. Based on the information obtained from each of the mobile devices of the member, the cloud based intelligent secretary application determines location, schedules, capabilities, and the like, of each member.

Using the information, at phase 704, the cloud based intelligent secretary application calculates multiple suggestions, with each suggestion comprising a meeting means, place and time that allows the minimum total disruption and cost, and/or maximum efficiency for the meeting by accessing the mobile device data of each member in the group. Each of the aforementioned suggestions are calculated by the cloud based intelligent secretary application, preferably by utilizing AI. In one embodiment, each of the suggestions are ranked based on amount of disruption and cost. The suggestion that causes least or no disruption and does not involve cost or minimal cost is ranked first, followed with other suggestions in increasing order of disruptions and cost.

In phase 706, the cloud based intelligent secretary application provides multiple suggestions to the members based on the calculations. The cloud based intelligent secretary application allows the members to select the suggestion that is convenient for them. In an embodiment, the cloud based intelligent secretary application selects a suggestion comprising a meeting means, place and time that is most widely accepted by the member responses.

Consider an example of scheduling a meeting using the cloud based intelligent secretary application for a group of five members located in Washington D.C. (USA) with a first member being a chief of a company. The first member may request the cloud based intelligent secretary application in his mobile device for arranging a meeting with the other four members. In response to the request, the cloud based intelligent secretary application initiates a meeting scheduling process.

The cloud based intelligent secretary application determines a location of the members. Based on the locations, the cloud based intelligent secretary application determines that the members are in the same city. The cloud based intelligent secretary application determines that a face to face meeting would be a best meeting means, due to geographical proximity of the members. The cloud based intelligent secretary application reviews calendars of the members to identify a common time slot available for the meeting. The cloud based intelligent secretary application performs calculation to determine multiple meeting suggestions, each meeting suggestion comprising a meeting means, place and time. The cloud based intelligent secretary application provides multiple meeting suggestions, each meeting suggestion providing a meeting means, place and time.

Any features of embodiment 70 may be readily combined or permuted with any of the other embodiments 10, 20, 21, 22, 30, 40, 50, 60, 80, 81, 90, 100, 110, 120 and/or 130 in accordance with the invention.

Figure 8A:
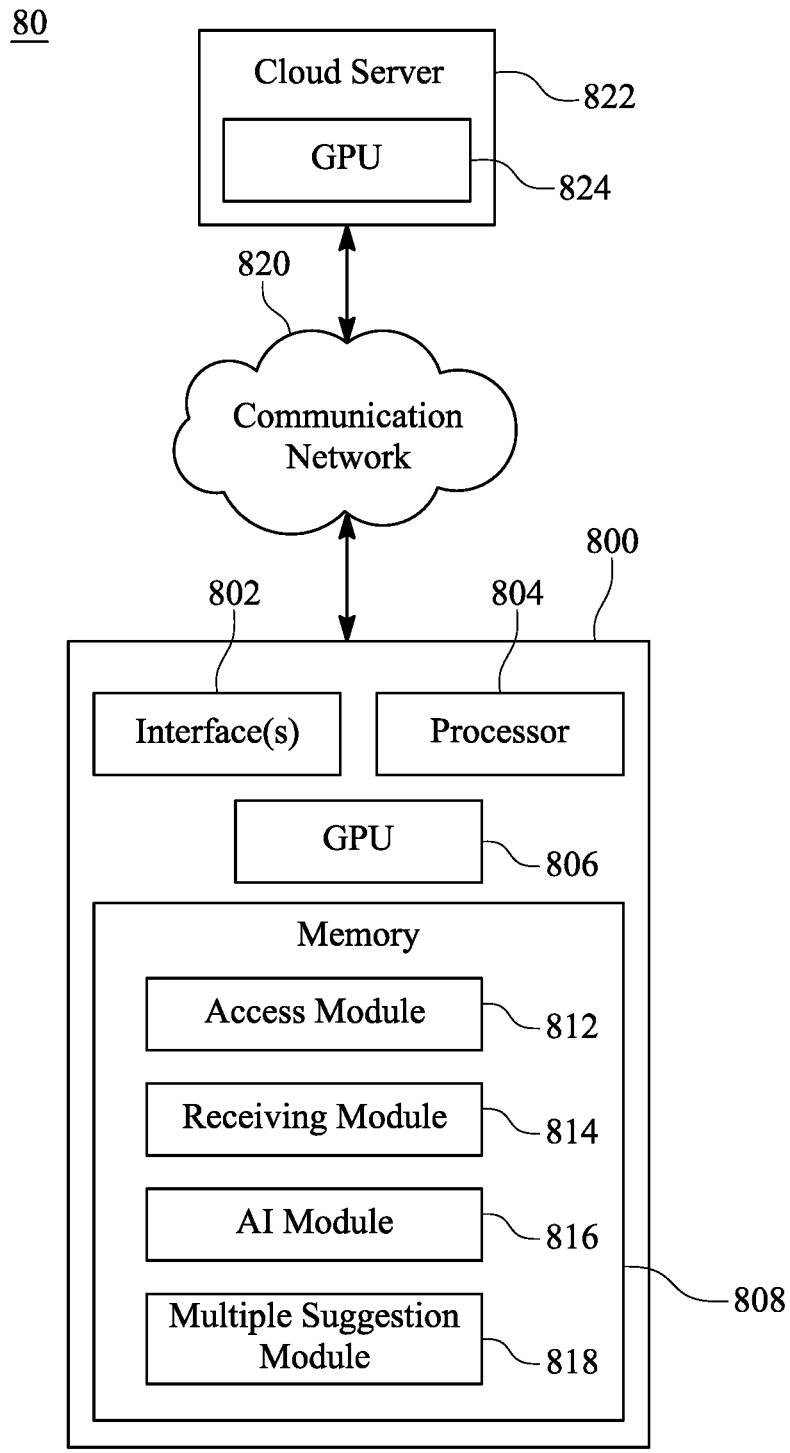
FIG. 8A illustrates an embodiment 80 of a block diagram of a system for executing the inventive cloud based intelligent secretary application.

FIG. 8A illustrates an embodiment 80 of a block diagram of a system 800 executing the inventive cloud based intelligent secretary application. The system comprises interface(s) 802, a processor 804, a GPU 806, and memory 808. The memory 808 comprises an access module 812, a receiving module 814, an AI module 816 and a multiple meeting suggestion module 818. In an embodiment, the system 800 is integrated with a cloud server 822, via a communication network 820. The cloud server 822, the GPU 824, and the communication network 820 are similar to the cloud server 222, GPU 228, and the communication network 220 of FIG. 2A respectively. Similarly, the access module 812, the receiving module 814, and the AI module 816 are similar to the access module 212, the receiving module 214, and the AI module 216, respectively.

The receiving module 814 of the cloud based intelligent secretary application receives a request for scheduling a meeting with at least two members of the group. Although, the figures describe forming a group for arranging a meeting, one can appreciate that some embodiments of the invention can arrange a meeting without forming a group as well. In response to the meeting request, receiving module 814 may trigger a meeting scheduling operation. The receiving module 814 may provide one or more options to add context to the meeting request. In one example implementation, the receiving module 814, may provide options to set a topic, a place, and the like, for the meeting.

The AI module 816 reads information from the data sources of each member in the group. Reading the information signifies accessing details such as data entries related to the member. Based on the information obtained from each of the mobile devices of the member, the AI module 816 determines location, schedules, capabilities, and the like, of each of the members. The AI module 816 uses the aforementioned information to calculate multiple suggestions, with each meeting suggestion comprising a meeting means, place and time that allows the minimum disruption and cost, and/or, maximum efficiency for the meeting by accessing the mobile device data of each member in the group. Each of the aforementioned meeting suggestions are calculated by the AI module 816. In one embodiment, each of the meeting suggestions are ranked based on amount of disruption and cost. The meeting suggestion that causes least or no disruption and does not involve cost or minimal cost is ranked first, followed with other meeting suggestions in increasing order of disruptions and cost.

The multiple suggestion module 818 of the cloud based intelligent secretary application provides multiple meeting suggestions to the members based on the calculations. The AI module 816 allows the members to select the meeting suggestion that is convenient for them. In an embodiment, the AI module 816 selects a meeting means, place and time that is most widely accepted by the member responses.

Any features of embodiment 80 may be readily combined or permuted with any of the other embodiments 10, 20, 21, 22, 30, 40, 50, 60, 70, 81, 90, 100, 110, 120, and/or 130 in accordance with the invention.

Figure 8B:
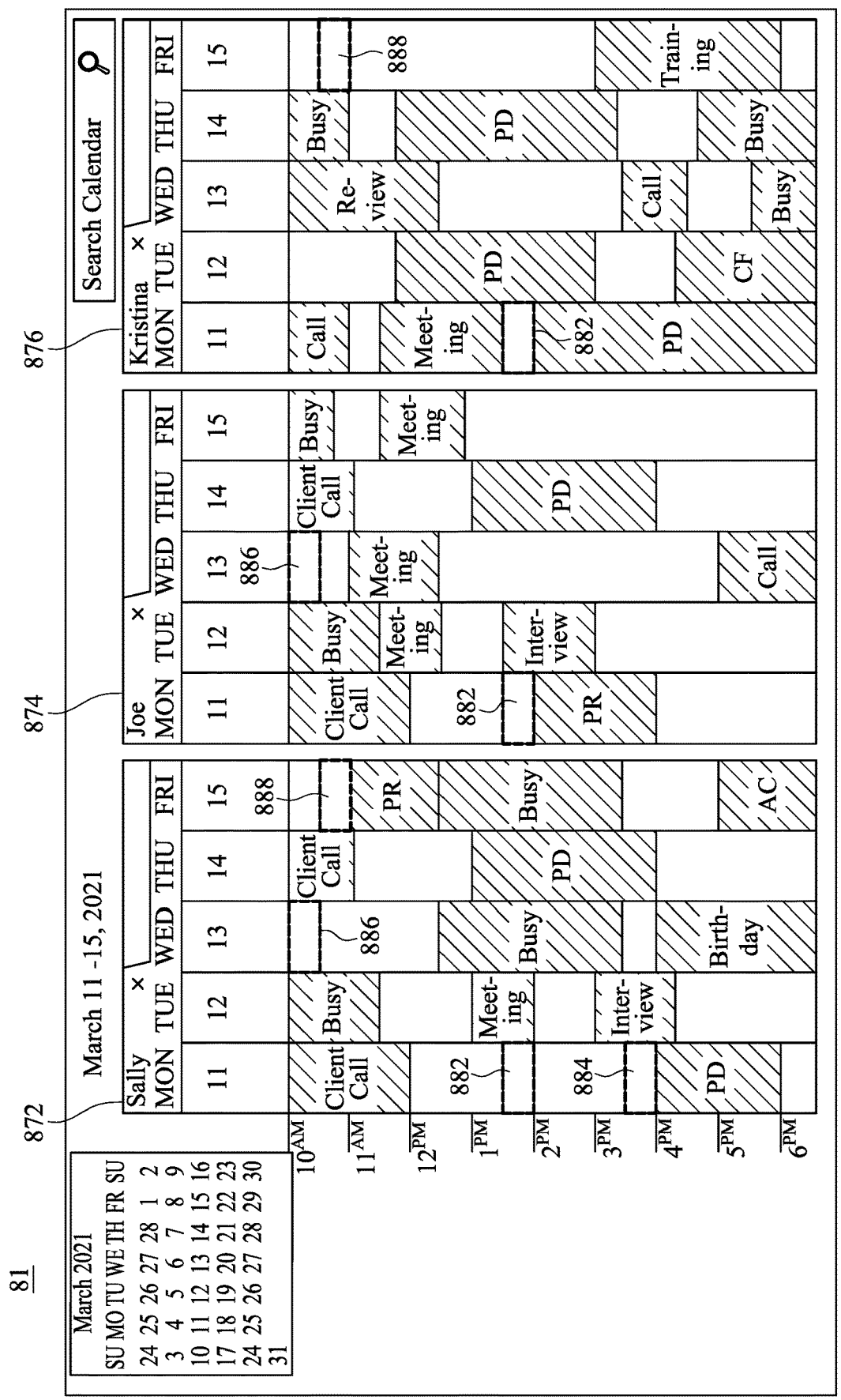
FIG. 8B illustrates an inventive embodiment 81 providing exemplary calendars and weighted average calculation.

FIG. 8B further illustrates the inventive embodiment 81 that provides exemplary calendars and weighted average calculation. FIG. 8B illustrates three calendars Sally 872, Joe 874 and Kristina 876. Sally is the boss of Joe and Kristina. The cloud based intelligent secretary application understands that Sally is the boss of Joe and Kristina based on analysis of their profiles. The cloud based intelligent secretary application assigns a weight of 100 for Sally.

Further, the cloud based intelligent secretary application also understands that Joe is a senior resource and is positioned in a management role. Consequently, the cloud based intelligent secretary application assigns a weight of 75 to Joe. The cloud based intelligent secretary application understands that Kristina is an executive reporting to Sally but also reports to Joe under matrix reporting. As a result, the cloud based intelligent secretary application assigns a weight of 50 to Kristina.

Consider a situation where Sally wants to conduct a meeting with Joe and Kristina. Sally uses the cloud based intelligent secretary application to schedule a meeting. The cloud based intelligent secretary application analyzes the calendars of Sally 872, Joe 874 and Kristina 876. The calendars are illustrated side-by-side in the figure. The cloud based intelligent secretary application analyzes the calendars semantically, visually or both to determine available slots for each. The cloud based intelligent secretary application determines that multiple options are available for a meeting: option 1, 882: 1.30 PM Monday available for Sally, Joe and Kristina; option 2, 886: 10.00 AM Wednesday available for Sally and Joe; option 3, 888: 10.30 AM Friday available for Sally and Kristina.

With the information on available slots, the cloud based intelligent secretary application determines a slot that is available for all three. Recognizing that Sally has the highest weight by virtue of being an important person, the cloud based intelligent secretary application applies highest significance considering Sally's profile and time. The cloud based intelligent secretary application identifies that option 1, 882 is available for Sally, Joe and Kristina with weighted average of 82.5. The calculation is an example weighted average calculation as described in FIG. 5B. The cloud based intelligent secretary application identifies that option 2, 886 is available for Sally, Joe and Kristina (with option of meeting cancelation for Kristina) with weighted average of 72.5. The cloud based intelligent secretary application identifies that option 3, 888 is available for Sally, Joe (with option of meeting cancelation for Joe) and Kristina with weighted average of 60.

The three options are shared with Sally, Joe and Kristina for selection. The option 1, 882, is provided as a first suggestion, the option 2, 886, is provided as a second suggestion and the option 3, 886, is provided as a third suggestion. In response to suggestions, Sally and Kristina accept option 1, 882, while Joe accepts option 2, 886. With Sally being the user with greatest weight, accepting the option 1, 882, the cloud based intelligent secretary application finalizes the option 1, 882, as the meeting schedule. If all participants had selected option 3, then that option would have been finalized as the meeting choice, even though it ranked lower than option 1.

Any features of embodiment 81 may be readily combined or permuted with any of the other embodiments 10, 20, 21, 22, 30, 40, 50, 60, 70, 80, 90, 100, 110, 120 and/or 130 in accordance with the invention.

Figure 9:
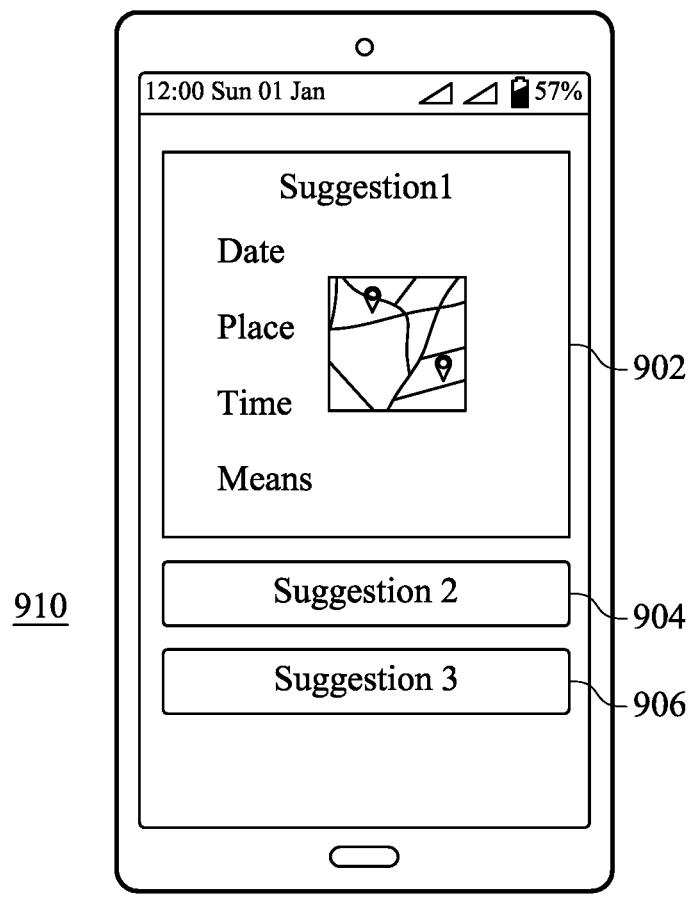
FIG. 9 demonstrates an embodiment 90 of a user interface showing the inventive cloud based intelligent secretary application providing multiple suggestion.

FIG. 9 demonstrates an embodiment 90 of a user interface 910 and 920 in accordance with the invention as a screen shot diagram. FIG. 9 illustrates an example interface that shows multiple suggestions. In an embodiment, the user interface 910 is shown to include the cloud based intelligent secretary application providing multiple suggestions 902-906. As discussed above, various aspects are considered for weighted average calculation. In the example, the suggestions are shown in collapsed user interface form. A member can click on any of the suggestions to view the expanded suggestion comprising the means, place, and time. For example, as illustrated, suggestion comprising the means, place, and time, corresponding to 902 is shown, as a response to selection of suggestion 1 902. The member can select a preferred suggestion for scheduling the meeting by clicking the suggestion icon on the touchscreen of the mobile device. In another example, the suggestions can be shown in expanded user interface form. In this example, the member can select a preferred suggestion by simply clicking the preferred icon on the touch screen of the mobile device.

Any features of embodiment 90 may be readily combined or permuted with any of the other embodiments 10, 20, 21, 22, 30, 40, 50, 60, 70, 80, 81, 100, 110, 120 and/or 130 in accordance with the invention.

Figure 10:
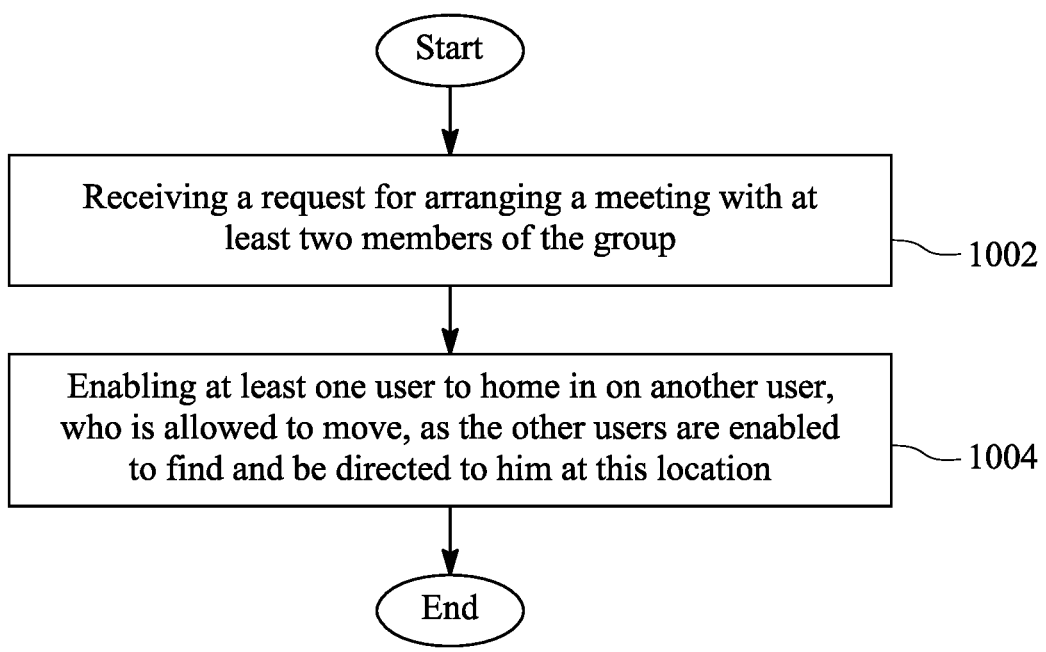
FIG. 10 illustrates an embodiment 100 of a flow chart showing an inventive method for providing dynamic suggestions comprising the meeting means, place and time, for other members to be directed to the member.

FIG. 10 illustrates an embodiment 100 of a flow chart showing an inventive method for providing dynamic suggestions on the meeting place and time, for other members to be directed to a member dynamically.

In phase 1002, the cloud based intelligent secretary application receives a request to schedule a meeting with at least two other members of the group. In response to the meeting request, the cloud based intelligent secretary application triggers a meeting scheduling operation. As described in the above figures, the cloud based intelligent secretary application analyses the calendars, profiles, etc., to determine a meeting means, place and time for the meeting. In some cases, a member would like to decide a meeting place manually instead of automatic selection of meeting location by the cloud based intelligent secretary application. For such cases, the cloud based intelligent secretary application provides an option to the member to set a location of one of the members as the location of meeting. The member can use the option to set a location of one of the members as the location of meeting before, during or after placing a meeting scheduling request. In response to using the option, the cloud based intelligent secretary application sets the location of one of the members as the meeting location and recalculates meeting means and time to minimize disruption and cost, and/or, maximize efficiency for the members of the group. The cloud based intelligent secretary application may provide options not only to requesting member but to any member to set a location of another member as the meeting location. In one embodiment, for instant meeting situations or in near-live meeting scheduling, the cloud based intelligent secretary application provides a homing option. In the homing option, the cloud based intelligent secretary application provides an option to any member to set a location of a member as the meeting place. If the member whose location has been set as the meeting place, moves to a different location, the cloud based intelligent secretary application dynamically sets that location as the meeting location. The cloud based intelligent secretary application communicates the new location to all the members.

In phase 1004, the cloud based intelligent secretary application enables at least one member to home in on another user, who is allowed to move. In response to any movement by the user who's location is the meeting place, the cloud based intelligent secretary application dynamically updates the new location as the meeting location. Subsequently, the cloud based intelligent secretary application communicates the new meeting location to other members.

Simultaneously, the cloud based intelligent secretary application measures distance from a location of each member to the meeting location. Also, the cloud based intelligent secretary application may dynamically determine the shortest route and time for each of the members to reach the meeting location. The AI of the cloud based intelligent secretary application uses dynamic traffic information, climatic conditions, driving time, walking time etc., to determine shortest route and time required for each member to reach the meeting location. In cases where the meeting location is continuously changing, the cloud based intelligent secretary application responsively and dynamically updates the meeting location. Simultaneously, the cloud based intelligent secretary application dynamically updates routes to the meeting location, the travel time and the alert time. It should be noted that the cloud based intelligent secretary application can optionally forecast traffic conditions and route times, using artificial intelligence and available software services in such situations. This can be done by using daily traffic patterns stored in historical data and calculating expected traffic conditions and/or route times for a future time period. Otherwise, the cloud based intelligent secretary application uses the known sources for such information. The cloud based intelligent secretary application calculates route time such that the user arrives at the meeting location, preferably not too early and not too late, but on time. The cloud based intelligent secretary application dynamically provides suggestions to the other members in response to change in location of the member, thereby directing the other members to the meeting location. In one example, the cloud based intelligent secretary application would operate the map and/or navigation applications of the other members to direct the other members to the meeting location dynamically.

Consider an example of scheduling a meeting using the cloud based intelligent secretary application for a group of three members of a family located in Helsinki. The three members may be a mother, father and son. In this example, the mother decides to have dinner with family in a restaurant 'A'. The mother requests the cloud based intelligent secretary application in her mobile device for arranging a dinner meeting with the father and the son at a given time slot. In response to the request, the cloud based intelligent secretary application initiates a meeting scheduling process. In the example, the mother uses a homing option to indicate her location. The cloud based intelligent secretary determines that the family dinner is of high priority and may cancel other meetings of the father and son, unless there are other meetings for father or son with higher priority. The cloud based intelligent secretary application determines the location of the son and the father. Based on the locations, the cloud based intelligent secretary application determines that the members are in the same city but at distances requiring some travel. The cloud based intelligent secretary application determines that since the meeting is for dinner, a face to face meeting is the default and/or preferred means of meeting. The cloud based intelligent secretary application performs calculation to determine a suggestion comprising event, pre-fixed location, time, distance and directions for the dinner event. However, the mother realizes that restaurant A is crowded and decides to move to restaurant B. In line with mother's movement to restaurant B, the cloud based intelligent secretary application dynamically changes the meeting place to restaurant B. Simultaneously, the cloud based intelligent secretary application provides suggestion comprising event, new location, time, modified distance and modified directions for the dinner meet to the father and son. Although, the figures describe forming a group for arranging a meeting, one can appreciate that some embodiments of the invention can arrange the meeting without forming a group as well.

Any features of embodiment 100 may be readily combined or permuted with any of the other embodiments 10, 20, 21, 22, 30, 40, 50, 60, 70, 80, 81, 90, 110, 120 and/or 130 in accordance with the invention.

Figure 11:
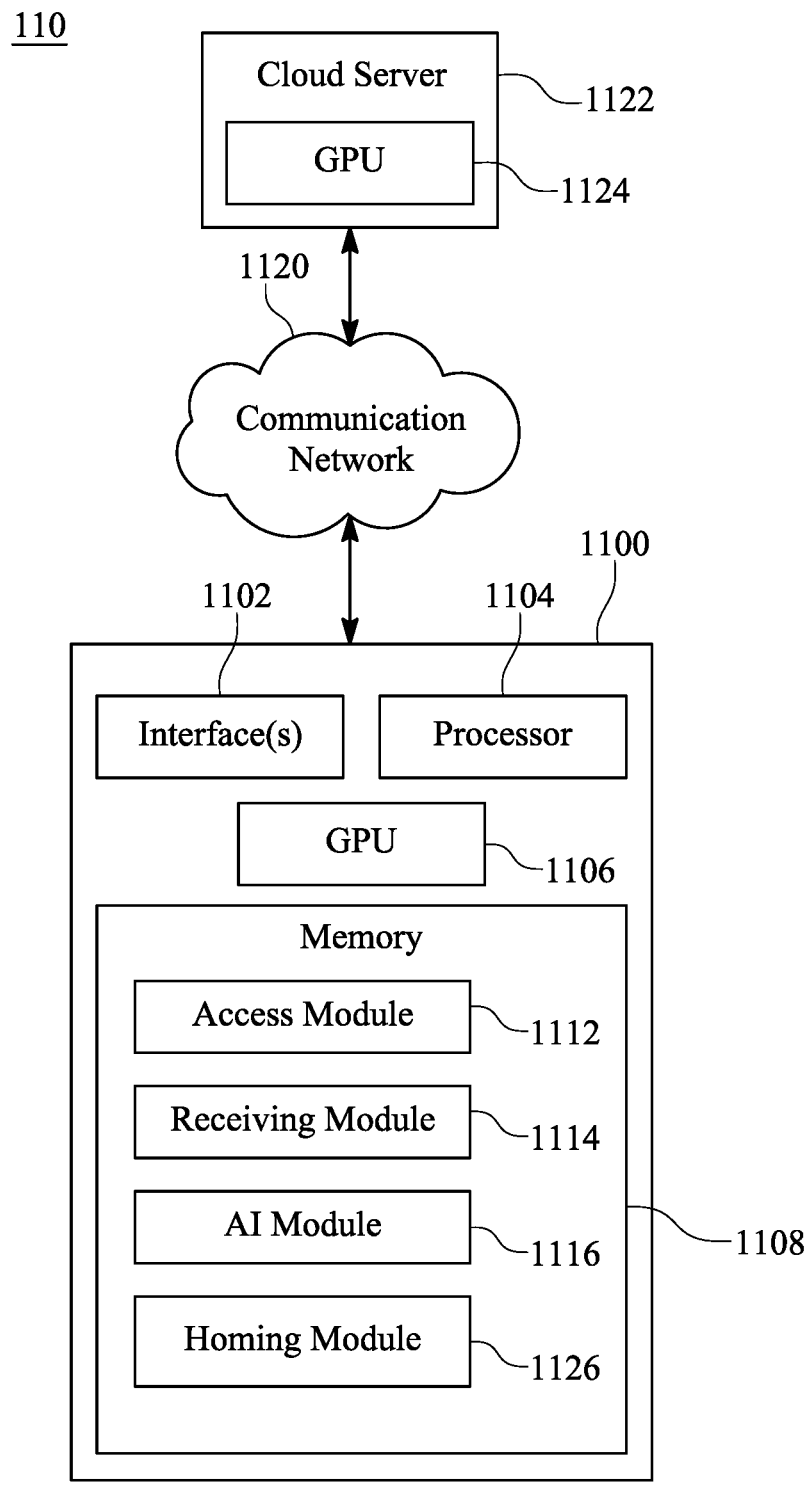
FIG. 11 illustrates an embodiment 110 of a block diagram of a system executing the inventive mobile secretary cloud application.

FIG. 11 illustrates an embodiment 1100 of a block diagram of a system 1100 executing the inventive cloud based intelligent secretary application. The system comprises interface(s) 1102, a processor 1104, a GPU 1106, and a memory 1108. The memory 1108 comprises an access module 1112, a receiving module 514, an AI module 1116 and a homing module 1126. In an embodiment, the system 1100 is integrated with a cloud server 1122, via a communication network 1120. The cloud server 1122, the GPU 1124, and the communication network 1120 are similar to the cloud server 222, GPU 224, and the communication network 220 of FIG. 2A respectively. Similarly, the access module 1112, the receiving module 1114, and the AI module 1116 are similar to the access module 212, the receiving module 214, and the AI module 216, respectively.

The receiving module 1114 of the cloud based intelligent secretary application receives a request to schedule a meeting with at least two other members of the group. In response to the meeting request, the receiving module 1114 may trigger a meeting scheduling operation. In an embodiment, the receiving module 1114 receives a command from a requesting member to set a location of the requesting member as a meeting location. In one example, by setting the location of the requesting member as the meeting location, the AI module 1116 can enable a homing option. In the homing option, the AI module 1116 would keep the location of the requesting member as a meeting location.

In response to movement of the requesting member to a different location, the AI module 1116 would dynamically update the new location as the meeting place. The AI module 1116 reads information from the data sources of each member in the group. Based on the information obtained from each of the mobile devices of the members, the AI module 1116 determines schedules, capabilities, and the like, of each of the member for the meeting. Using the information, the AI module 1116 provides a suggestion comprising a meeting means, pre-determined meeting place, and time for the meeting to each meeting participant.

The homing module 1126 enables at least one member to home in on another user, who is allowed to move, as the other users are enabled to find and be directed to the user and the meeting location. In one aspect of the invention, the AI module 1116 measures distance between the meeting location and a location of each user mobile device. The location of the user is determined from the user mobile device. In this case, the meeting place, the travel time and/or the alert time of the other users is continuously updated as the homing location of mobile device of the user being homed on changes. The AI module 1116 monitors the location of all users, route between the users and the meeting location, traffic and other factors that would influence the travel time.

The suggestion module 1118 may dynamically provide suggestions to the users in response to changes in meeting location of the user, thereby directing the other users to the meeting location. In one example, the AI module 1116 may operate the map applications of the other users to direct them to the meeting location dynamically.

Any features of embodiment 110 may be readily combined or permuted with any of the other embodiments 10, 20, 21, 22, 30, 40, 50, 60, 70, 80, 81, 90, 100, 120 and/or 130 in accordance with the invention.

Figure 12:
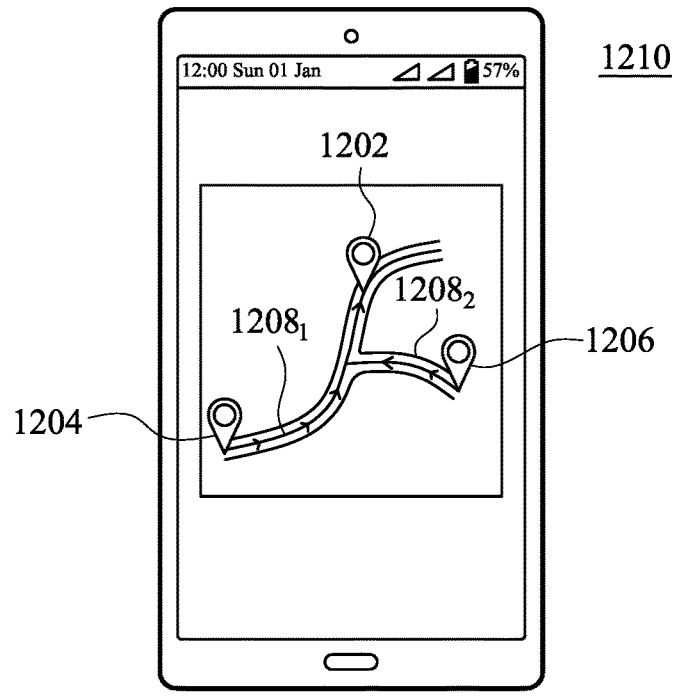
FIG. 12 demonstrates an inventive embodiment 120 of a user interface showing a homing option.
Figure 12:
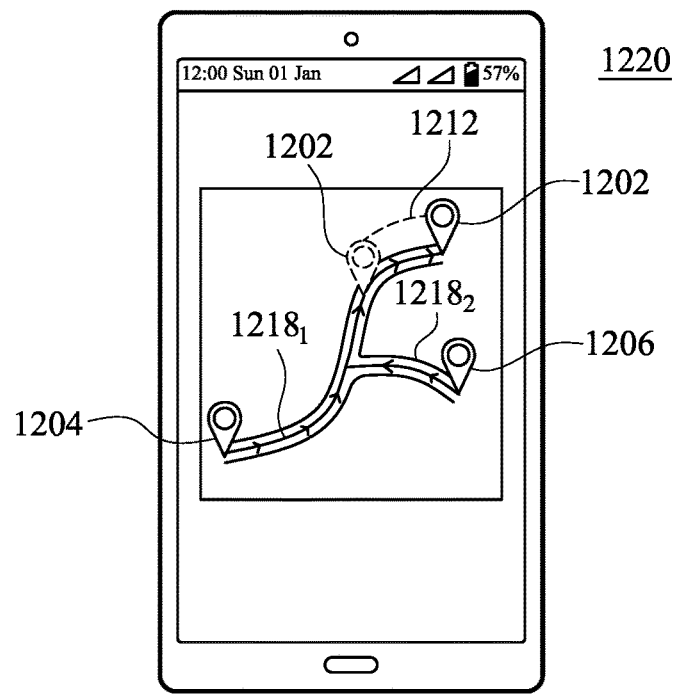

FIG. 12 demonstrates an inventive embodiment 120 of a user interface 1210 and 1220 in accordance with the invention as a screen shot diagram. FIG. 12 illustrates an example interface that shows dynamic nature of the application for arranging the meeting. In an embodiment, the interface 1210 illustrates locations of three members 1202-1206. In an example embodiment, a member who has set up the meeting has requested to set his location as the meeting place. The interface 1210 shows the icon at location 1202 of this member on a map application as a homing location, and this location is subjected to change in response to movement of the member associated with icon 1202. The interface 1210 also shows directions from 1204 and 1206 to reach 1202 via 12081 and 12082 respectively.

The interface 1220 illustrates change in location of icon 1202 to icon 1212 due to movement of the user associated with 1202 and 1212. As a result, the interface 1220 also shows an update in directions for 1204 and 1206 to reach 1212. In some embodiments this "homing in" feature of embodiments of the invention could be realized in an existing tracking software like "Find My"-app in Apple's iPhone or the corresponding Android equivalent.

Any features of embodiment 120 may be readily combined or permuted with any of the other embodiments 10, 20, 21, 22, 30, 40, 50, 60, 70, 80, 81, 90, 100, 110 and/or 130 in accordance with the invention.

Figure 13:
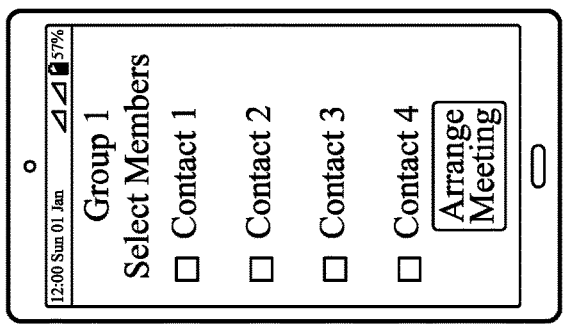
FIG. 13 demonstrates an embodiment 130 of a user interface showing implementation of the inventive mobile secretary cloud application within a social media network.
Figure 13:
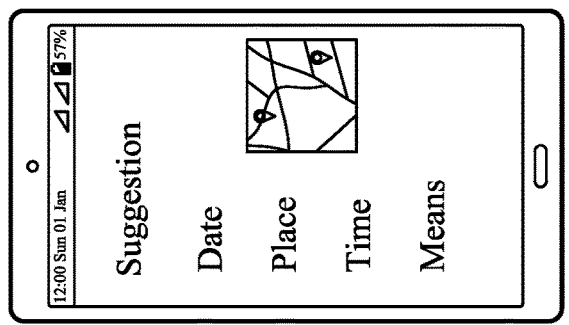
Figure 13:
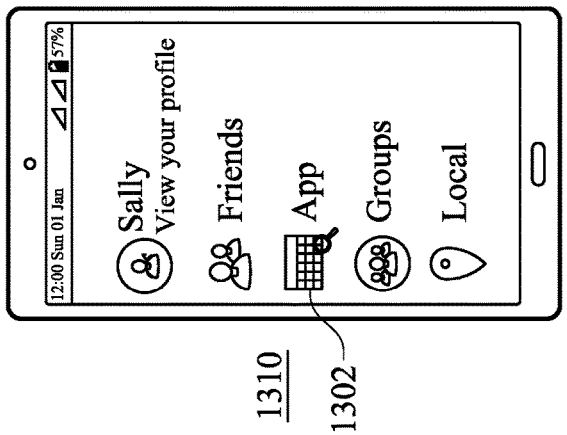
Figure 13:
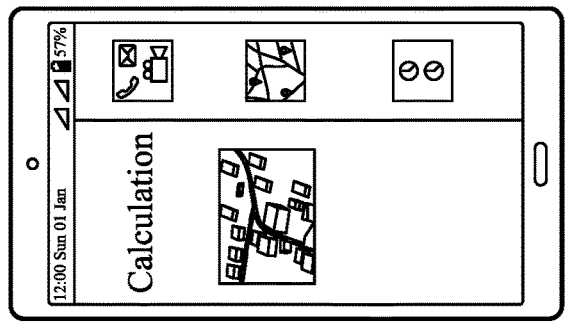
Figure 13:
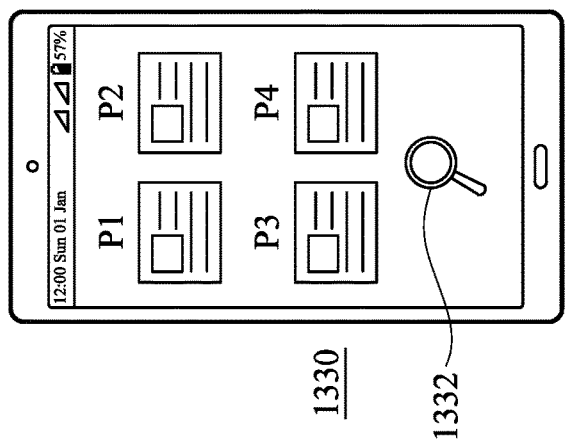

FIG. 13 demonstrates an embodiment 130 of a user interface 1310, 1320 and 1330 in accordance with the invention as a screen shot diagram. The figure illustrates one or more embodiments of the invention implemented as an application on a social networking platform Facebook®. It is well known that Facebook has the largest repository of contacts. There is a high likelihood that most of computer literate people using a smart phone could be using a Facebook. Some embodiments of the invention help people on Facebook to schedule a meeting with their contacts using the cloud based intelligent secretary application. Facebook allows its users to add any application to their personal page from App Center repository. One or more embodiments of the invention implemented as an app can be added by a user to his personal page. The user interface 1310 illustrates the implemented cloud based intelligent secretary application 1302 on a Facebook page. The user can run the cloud based intelligent secretary application 1302 by clicking on the application icon 1302. The application would list out contacts in contact list to schedule a meeting as illustrated in 1320. The user can select the contacts for the meeting. In response to the selection, the cloud based intelligent secretary application accesses profile data of each member in the group including their individual calendars as illustrated in the user interface 1330.

Further, the cloud based intelligent secretary application analyzes 1332 calendars of the selected contacts to determine available slots of each of the selected contacts to schedule a meeting. The application analyzes profiles of each contact, locations of each contact, time zones of each contact, available meeting means of each contact, preferences of each contact, past behavior of each contact, weights to one or more aforementioned aspects, cost involved, etc.

An example screenshot during the analysis and calculation is shown in the user interface 1340. Using the aspects, the cloud based intelligent secretary application determines a meeting schedule by calculating a meeting means, place and time that allows minimum total disruption and cost, and/or, maximum efficiency for the meeting. The meeting schedule is displayed to the user as illustrated in 1350. In response to acceptance of the meeting schedule, the cloud based intelligent secretary application may guide the users until the meeting takes place. In this embodiment the cloud based intelligent secretary application preferably uses features provided by the Facebook including contact list, event scheduler, maps, data sources such as weather and traffic, etc., to accomplish the meeting.

All embodiments of the invention can be used with a mobile app or alternatively via an Internet browser. All embodiments of the invention can also be applied to calculating a meeting point for uber drivers to drop-off and pick-up a passenger when the trip is split between two cars and two drivers. Similarly, some embodiments of the invention can be used to calculate the rendezvous point of cars, or self-driving cars. However, the best mode of the invention is considered to be a productivity tool, such as Microsoft Teams. The best mode for implementing the invention could be a Microsoft Teams software application and/or a LinkedIn application. One or more embodiments of the invention are geared towards arranging meetings so that they minimize disruption and cost, which usually is a desired objective with business productivity software. With social networking software the objective could be changed to maximize convenience, social involvement and emotional pleasure in accordance with the invention.

Any features of embodiment 130 may be readily combined or permuted with any of the other embodiments 10, 20, 21, 22, 30, 40, 50, 60, 70, 80, 81, 90, 100, 110 and/or 120 in accordance with the invention.

One or more embodiments of the invention have many critical advantages that benefit the consumer: the user can now simply schedule a meeting by placing a request to the cloud based intelligent secretary application. The cloud based intelligent secretary application schedules a meeting for a user in response to a request. The user does not have to look at the calendars of other users, which at times may not be visible to the user, or the user may not have permission or willingness to access these calendars. The user does not have to communicate with other users to discuss and determine a meeting schedule. The cloud based intelligent secretary application being able to view the calendars of the users, can make educated prediction and at times accurately determine the time slots for which a meeting can be conveniently scheduled. The cloud based intelligent secretary application saves a lot of time, administrative labor, resources and costs involved in meeting scheduling.

The invention has been explained above with reference to the aforementioned embodiments. However, it is clear that the invention is not only restricted to these embodiments but comprises all possible embodiments within the spirit and scope of the inventive thought and the following patent claims.

REFERENCES

US 2018/0308473 A1 INTELLIGENT VIRTUAL ASSISTANT SYSTEMS AND RELATED METHODS, published on Oct. 25, 2018, Wayne SCHOLAR US 2016/0327281 A1 CONNECTED FOOD PREPARATION SYSTEM AND METHOD OF USE, published on Nov. 10, 2016 Bhogal et al.
WO 2011/020742 A1, METHOD AND MEANS FOR DATA SEARCHING AND LANGUAGE TRANSLATION, 2011, Mikko Väänänen.
A PRACTICAL INTRODUCTION TO DEEP LEARNING WITH CAFFE AND PYTHON, published on Jun. 26, 2016, Adil Moujahid.
PCT/FI2018/050841 (unpublished application), incorporated herein as reference, Mikko Väänänen.

What is claimed is:

1. A system, comprising:
a processor; and
a memory including instructions that when executed by the processor provide a cloud based secretary software program product that operates with mobile devices and a cloud server, configured to perform operations comprising:
receiving a request for the cloud based secretary software program product to arrange a meeting;
accessing, by the cloud based secretary software program product, at least a first mobile device associated with a first user and a second mobile device associated with a second user;
accessing a first calendar associated with the first user and a second calendar associated with the second user;
accessing mobile device data of at least the first mobile device and the second mobile device;
calculating disruption to one or more previously scheduled meetings for the first user or the second user based on a combination of two or more of: (i) a medium, (ii) a place, or (iii) a time for the meeting;
identifying, by the cloud based secretary software program product, two or more of: (i) a medium, (ii) a place, or (iii) a time for the meeting, based on the calculated disruption, using the mobile device data of at least the first mobile device and the second mobile device;
suggesting the two or more: (i) the medium, (ii) the place, or (iii) the time for the meeting, for the first user and the second user to accept or decline the meeting; and
in response to the first user and the second user accepting the meeting and setting the place as where the first user is located, directing the second user to a location of the first mobile device as the first mobile device moves in an environment.

2. The system of claim 1, wherein identifying at least one of the medium, the place, or the time is based on a time zone relating to at least one of the first user or the second user.

3. The system of claim 2, wherein the cloud based secretary software program product presents to the first user information relating to the first calendar associated with the first user and declines to present to the first user information relating to the second calendar associated with the second user.

4. The system of claim 3, wherein the identifying the two or more: (i) the medium, (ii) the place, or (iii) the time for the meeting, based on the calculated disruption comprises:
identifying at least one of the medium, the place, or the time for the meeting to present a minimum total disruption to previously scheduled meetings for at least the first user and the second user.

5. The system of claim 3, further comprising:
training a machine learning (ML) model associated with the cloud based secretary software program product, after the first user and the second user accept the meeting, using data relating at least in part to the first user and the second user accepting the meeting.

6. The system of claim 3,
wherein the meeting comprises at least one mandatory participant and at least one optional participant, and
wherein identifying at least one of the medium, the place, or the time for the meeting is based on performing a weighted average calculation, the weighted average calculation comprising at least one of: (i) giving more weight to a calendar for the mandatory participant than a calendar for the optional participant, or (ii) giving equal weights to the calendar for the mandatory participant and the calendar for the optional participant.

7. The system of claim 3, further comprising:
training an ML model associated with the cloud based secretary software program product using data relating to at least one of the first calendar or the second calendar,
wherein the identifying two or more of: (i) the medium, (ii) the place, or (iii) the time for the meeting uses the ML model.

8. The system of claim 7, wherein the ML model is trained for at least one of semantic or visual artificial intelligence (AI) analysis using the data relating to at least one of the first calendar or the second calendar.

9. The system of claim 8, wherein the cloud server comprises a graphics processing unit (GPU) and wherein the GPU is used for at least one of the training or the AI analysis of the ML model.

10. The system of claim 3, wherein identifying at least one of the medium, the place, or the time for the meeting is based on giving equal weight to the first calendar associated with the first user and the second calendar associated with the second user.

11. The system of claim 1, wherein directing the second user to the location of the first mobile device as the first mobile device moves in the environment further comprises:
presenting the location of the first mobile device to the second user on a user interface comprising a map.

12. The system of claim 11, further comprising:
receiving permission from the first user to present the location of the first mobile device to the second user, prior to presenting the location of the first mobile device to the second user.

13. The system of claim 12, further comprising:
determining a route from the location of the second user device to the first mobile device, based on at least one of: (i) traffic information, (ii) climate information, (iii) driving time, or (iv) walking time; and
presenting the route to the second user.

14. The system of claim 11, further comprising:
presenting to at least one of the first user or the second user a second location within a distance of the location of the first mobile device.

15. The system of claim 1, wherein at least one of:
(i) identifying at least one of the medium, the place, or the time for the meeting is based on information retrieved from an electronic social network relating to at least one of the first user or the second user, or
(ii) the location of the first mobile device is presented to the second user using an electronic social network.

16. A non-transitory computer readable storage medium storing a cloud based secretary software program product for scheduling a meeting using mobile devices and a cloud server, by performing operations comprising:
receiving a request for the cloud based secretary software program product to arrange a meeting;

accessing, by the cloud based secretary software program product, at least a first mobile device associated with a first user and a second mobile device associated with a second user;

accessing a first calendar associated with the first user and a second calendar associated with the second user;

accessing mobile device data of at least the first mobile device and the second mobile device;

calculating disruption to one or more previously scheduled meetings for the first user or the second user based on a combination of two or more of: (i) a medium, (ii) a place, or (iii) a time for the meeting;

identifying, by the cloud based secretary software program product, two or more of: (i) a medium, (ii) a place, or (iii) a time for the meeting, based on the calculated disruption, using the mobile device data of at least the first mobile device and the second mobile device;

suggesting the two or more of: (i) the medium, (ii) the place, or (iii) the time for the meeting, for the first user and the second user to accept or decline the meeting; and in response to the first user and the second user accepting the meeting and setting the place as where the first user is located, directing the second user to a location of the first mobile device as the first mobile device moves in an environment.

17. The non-transitory computer readable storage medium of claim 16, wherein identifying at least one of the medium, the place, or the time is based on a time zone relating to at least one of the first user or the second user.

18. The non-transitory computer readable storage medium of claim 17, wherein the cloud based secretary software program product presents to the first user information relating to the first calendar associated with the first user and declines to present to the first user information relating to the second calendar associated with the second user.

19. The non-transitory computer readable storage medium of claim 18, wherein the identifying the two or more of: (i) the medium, (ii) the place, or (iii) the time for the meeting, based on the calculated disruption comprises:

identifying at least one of the medium, the place, or the time for the meeting to present a minimum total disruption to previously scheduled meetings for at least the first user and the second user.

20. The non-transitory computer readable storage medium of claim 18, further comprising:

training a machine learning (ML) model associated with the cloud based secretary software program product, after the first user and the second user accept the meeting, using data relating at least in part to the first user and the second user accepting the meeting.

21. The non-transitory computer readable storage medium of claim 18, wherein the meeting comprises at least one mandatory participant and at least one optional participant, and wherein identifying at least one of the medium, the place, or the time for the meeting is based on performing a weighted average calculation, the weighted average calculation comprising at least one of: (i) giving more weight to a calendar for the mandatory participant than a calendar for the optional participant, or (ii) giving equal weights to the calendar for the mandatory participant and the calendar for the optional participant.

22. The non-transitory computer readable storage medium of claim 18, further comprising:

training an ML model associated with the cloud based secretary software program product using data relating to at least one of the first calendar or the second calendar, wherein the identifying two or more of: (i) the medium, (ii) the place, or (iii) the time for the meeting uses the ML model.

23. The non-transitory computer readable storage medium of claim 22, wherein the ML model is trained for at least one of semantic or visual artificial intelligence (AI) analysis using the data relating to at least one of the first calendar or the second calendar.

24. The non-transitory computer readable storage medium of claim 23, wherein the cloud server comprises a graphics processing unit (GPU) and wherein the GPU is used for at least one of the training or the AI analysis of the ML model.

25. The non-transitory computer readable storage medium of claim 18, wherein identifying at least one of the medium, the place, or the time for the meeting is based on giving equal weight to the first calendar associated with the first user and the second calendar associated with the second user.

26. The non-transitory computer readable storage medium of claim 16, wherein directing the second user to the location of the first mobile device as the first mobile device moves in the environment further comprises:

presenting the location of the first mobile device to the second user on a user interface comprising a map.

27. The non-transitory computer readable storage medium of claim 26, further comprising:

receiving permission from the first user to present the location of the first mobile device to the second user, prior to presenting the location of the first mobile device to the second user.

28. The non-transitory computer readable storage medium of claim 27, further comprising:

determining a route from the location of the second user device to the first mobile device, based on at least one of: (i) traffic information, (ii) climate information, (iii) driving time, or (iv) walking time; and presenting the route to the second user.

29. The non-transitory computer readable storage medium of claim 26, further comprising:

presenting to at least one of the first user or the second user a second location within a distance of the location of the first mobile device.

30. The non-transitory computer readable storage medium of claim 16, wherein at least one of:

(i) identifying at least one of the medium, the place, or the time for the meeting is based on information retrieved from an electronic social network relating to at least one of the first user or the second user, or (ii) the location of the first mobile device is presented to the second user using an electronic social network.

* * * * *